(12) United States Patent
Maeser

(10) Patent No.: US 11,615,328 B2
(45) Date of Patent: Mar. 28, 2023

(54) SYSTEM AND METHOD FOR ANALYZING CLOUD SERVICE PROVIDER TRUSTWORTHINESS AND FOR PREDICTING CLOUD SERVICE LEVEL AGREEMENT PERFORMANCE

(71) Applicant: The George Washington University, Washington, DC (US)

(72) Inventor: Robert Maeser, Eagan, MN (US)

(73) Assignee: The George Washington University, Washington, DC (US)

(*) Notice: Subject to any disclaimer, the term of this patent is extended or adjusted under 35 U.S.C. 154(b) by 353 days.

(21) Appl. No.: 16/847,167

(22) Filed: Apr. 13, 2020

(65) Prior Publication Data

US 2020/0327434 A1    Oct. 15, 2020

Related U.S. Application Data

(60) Provisional application No. 62/832,985, filed on Apr. 12, 2019.

(51) Int. Cl.
*H04L 41/50*   (2022.01)
*G06N 5/04*   (2023.01)
(Continued)

(52) U.S. Cl.
CPC .............. *G06N 5/04* (2013.01); *G06N 20/00* (2019.01); *H04L 41/145* (2013.01);
(Continued)

(58) Field of Classification Search
CPC . H04L 41/145; H04L 41/147; H04L 41/5096; H04L 43/55; H04L 41/16; H04L 41/5009
See application file for complete search history.

(56) References Cited

U.S. PATENT DOCUMENTS

| 10,417,593 B1* | 9/2019 | Norbeck, Jr. ........ G06F 16/9535 |
| 2012/0110462 A1* | 5/2012 | Eswaran ............. H04L 12/1439 |
| | | 709/224 |

(Continued)

OTHER PUBLICATIONS

CAIQv3.0.1 "Consensus Assessments Working Group." Cloud Security Alliance. Accessed Jul. 2, 2017. https://cloudsecurityalliance.org/group/consensus-assessments/#_overview, 424 pgs.
(Continued)

*Primary Examiner* — Philip C Lee
(74) *Attorney, Agent, or Firm* — Blank Rome LLP

(57) ABSTRACT

Effective management of cloud computing service levels (e.g. availability, performance, security) and financial risk is dependent on the cloud service provider's (CSP's) capability and trustworthiness. The invention applies industry cloud service level agreements (SLAs) with statistical and machine learning models for assessing CSPs and cloud services, and predicting performance and compliance against service levels. Cloud SLAs (ISO/IEC, EC, ENISA), cloud security requirements and compliance (CSA CCM, CAIQ), along with CSP performance (SLAs, cloud services) are analyzed via Graph Theory analysis and MCDA AHP to calculate CSP trustworthiness levels. CSP trustworthiness levels are input with CSP SLA content, cloud service performance measurements and configuration parameters into machine learning Regression analysis models to predict CSP cloud service performance and cloud SLA compliance, and enable model analysis and comparison. This can be used to determine which regression variables provide the highest predictive accuracy, enabling cloud service customers (CSCs) and CSPs opportunities for transparency, traceability and effective governance of cloud service levels, cloud services and management of risk.

19 Claims, 36 Drawing Sheets

(51) Int. Cl.
  G06N 20/00   (2019.01)
  H04L 43/55   (2022.01)
  H04L 41/14   (2022.01)
  H04L 41/147  (2022.01)

(52) U.S. Cl.
  CPC ........ *H04L 41/147* (2013.01); *H04L 41/5096* (2013.01); *H04L 43/55* (2022.05)

(56) References Cited

U.S. PATENT DOCUMENTS

| | | | | |
|---|---|---|---|---|
| 2014/0047099 | A1* | 2/2014 | Flores | H04L 67/75 709/224 |
| 2014/0278808 | A1* | 9/2014 | Iyoob | G06Q 30/0206 705/7.35 |
| 2015/0142978 | A1* | 5/2015 | Anderson | H04L 41/5006 709/226 |
| 2015/0341240 | A1* | 11/2015 | Iyoob | G06Q 30/0629 709/201 |
| 2016/0125489 | A1* | 5/2016 | Gupte | H04L 67/566 705/26.61 |
| 2016/0139915 | A1* | 5/2016 | Dimitrakos | G06F 8/71 717/126 |
| 2016/0147522 | A1* | 5/2016 | Dimitrakos | G06F 8/61 717/174 |

OTHER PUBLICATIONS

Hogben, et al., "Procure Secure: A Guide to Monitoring of Security Service Levels in Cloud Contracts." Enisa.europa.eu. Apr. 2, 2012, 64 pgs.: https://www.enisa.europa.eu/publications/procure-secure-a-guide-to-monitoring-of-security-service-levels-in-cloud-contracts/at_download/fullReport.

CSA CCM (2017). "Cloud Controls Matrix Working Group." Cloud Security Alliance. Accessed Jul. 2, 2017. http://cloudsecurityalliance.org/group/cloud-controls-matrix/, 1,404 pgs.

Saaty, *"Decision Making for Leaders the Analytic Hierarchy Process for Decisions in a Complex World"*, Pittsburgh, PA: RWS Publ., 2012, 5 pgs.

EC (2014). "Cloud Service Level Agreement Standardisation Guidelines." Ec.europa.eu. Jun. 24, 2014. http//ec.europa.eu/newsroom/dae/document.cfm?action=display&doc_id=6138, 41 pgs.

Chatterjee, et al., *"Regression Analysis by Example"*, Somerset: Wiley, 2013, 7 pgs.

Emeakaroha, et al., "Low Level Metrics to High Level SLAs—LoM2HIS Framework: Bridging the Gap between Monitored Metrics and SLA Parameters in Cloud Environments." 2010 International Conference on High Performance Computing & Simulation, 2010. doi:10.1109/hpcs.2010.5547150, 7 pgs.

Almanea, et al., "Cloud Advisor—A Framework towards Assessing the Trustworthiness and Transparency of Cloud Providers." *2014 IEEE/ACM 7th International Conference on Utility and Cloud Computing,* 2014. doi:10.1109/ucc.2014.168, 2 pgs.

Hunnebeck, Lou, Colin Rudd, Shirley Lacy, and Ashley Hanna. ITIL Service Design. London: TSO, 2011.

* cited by examiner

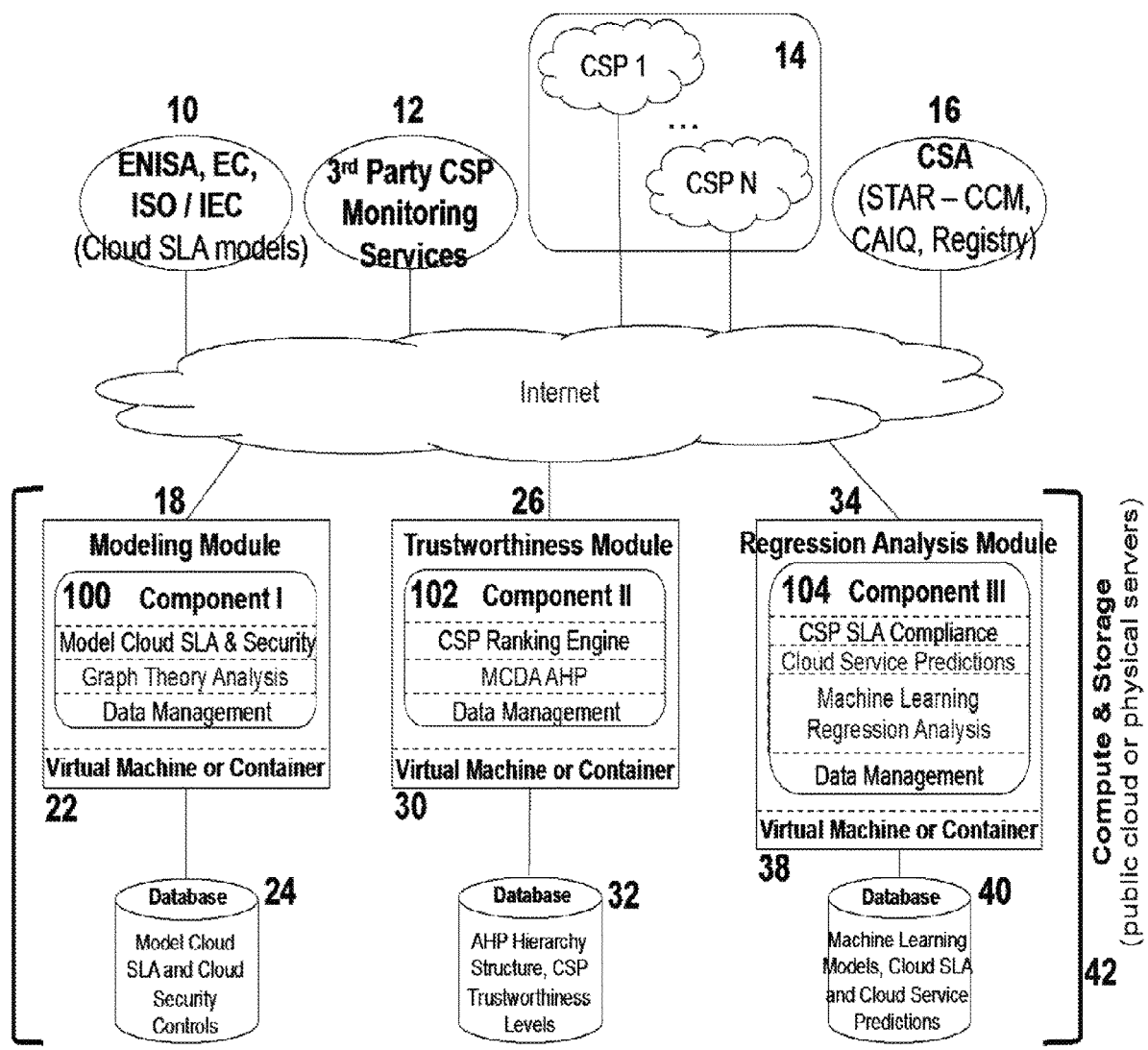
Figure 1(a) Architecture for CSP Trustworthiness and Cloud SLA Performance

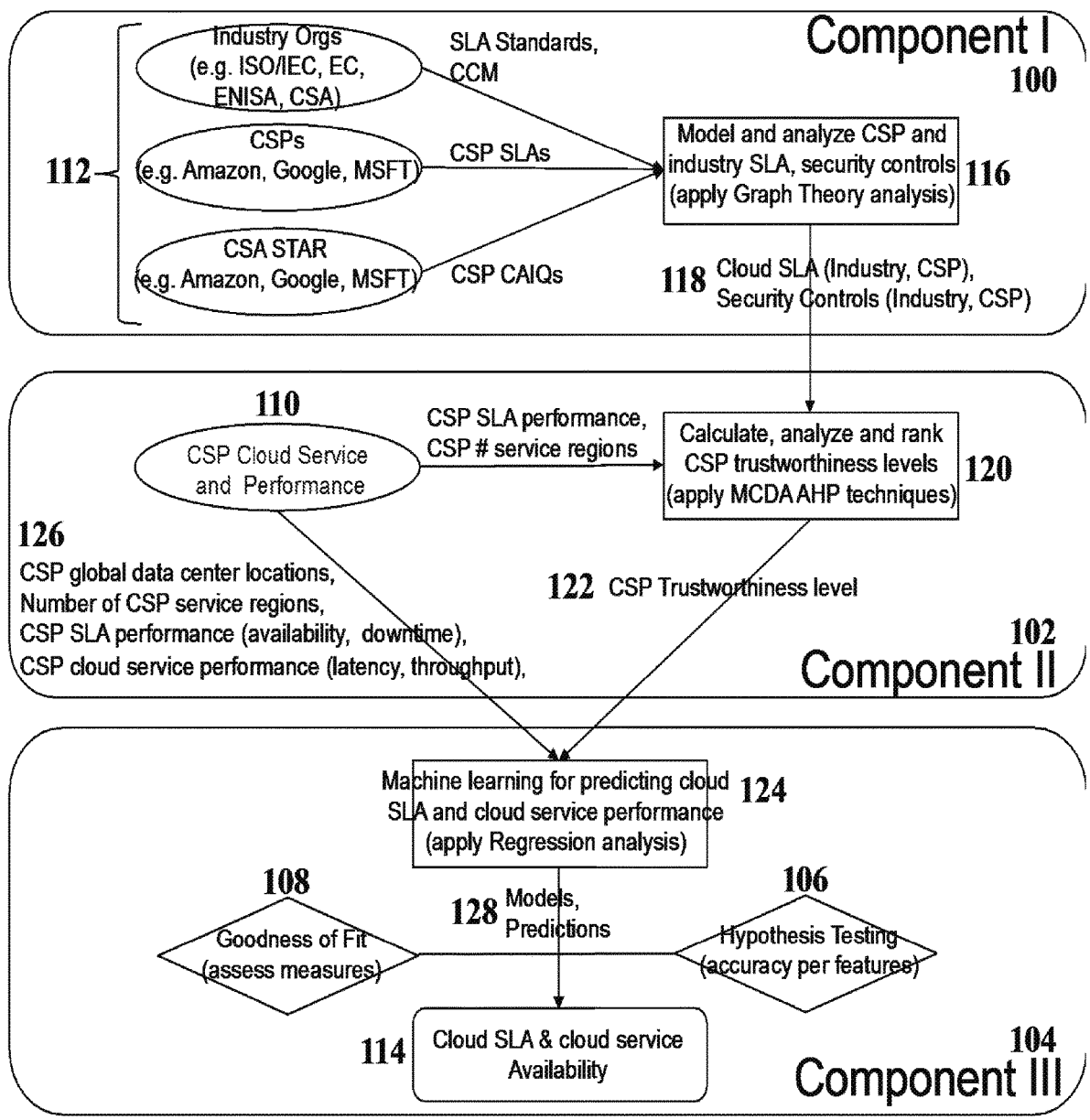
Figure 1(b) Architecture for CSP Trustworthiness and Cloud SLA Performance

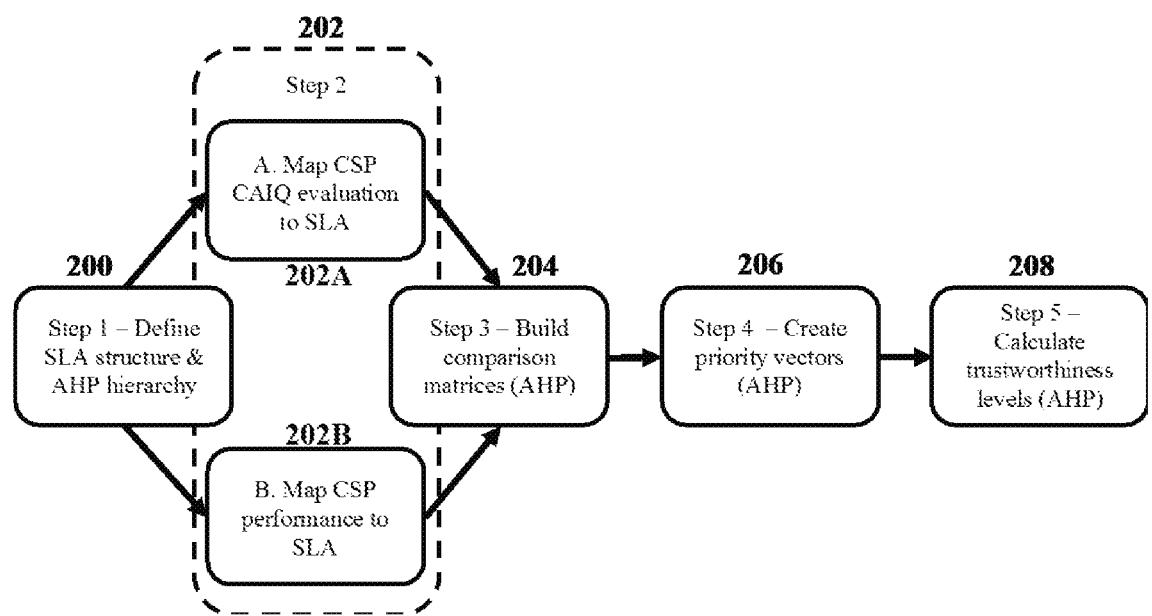
Figure 2 AHP based CSP Trustworthiness framework

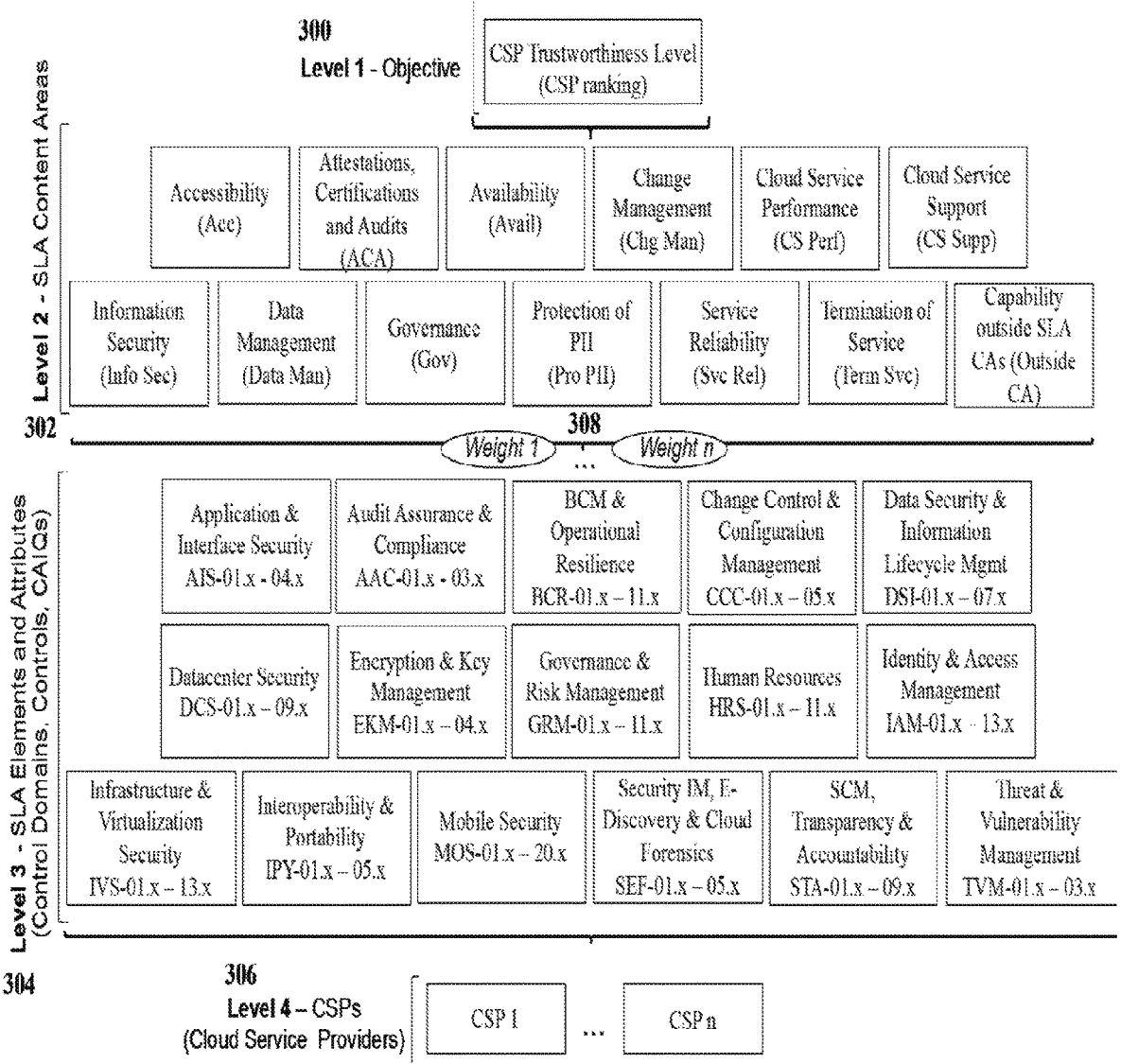

Figure 3 AHP Hierarchy Structure

SLA Content Areas: Identified the high level of the SLA structure, representing the hierarchies of SLA elements (e.g. components, control domains).
SLA Elements: Defines the components and control domains within a SLA Content Area, and represents the related hierarchy of controls, SLOs (service level objectives) and attributes.
SLA Attributes: Represents capabilities related to controls, SLOs, CAIQs and attributes.

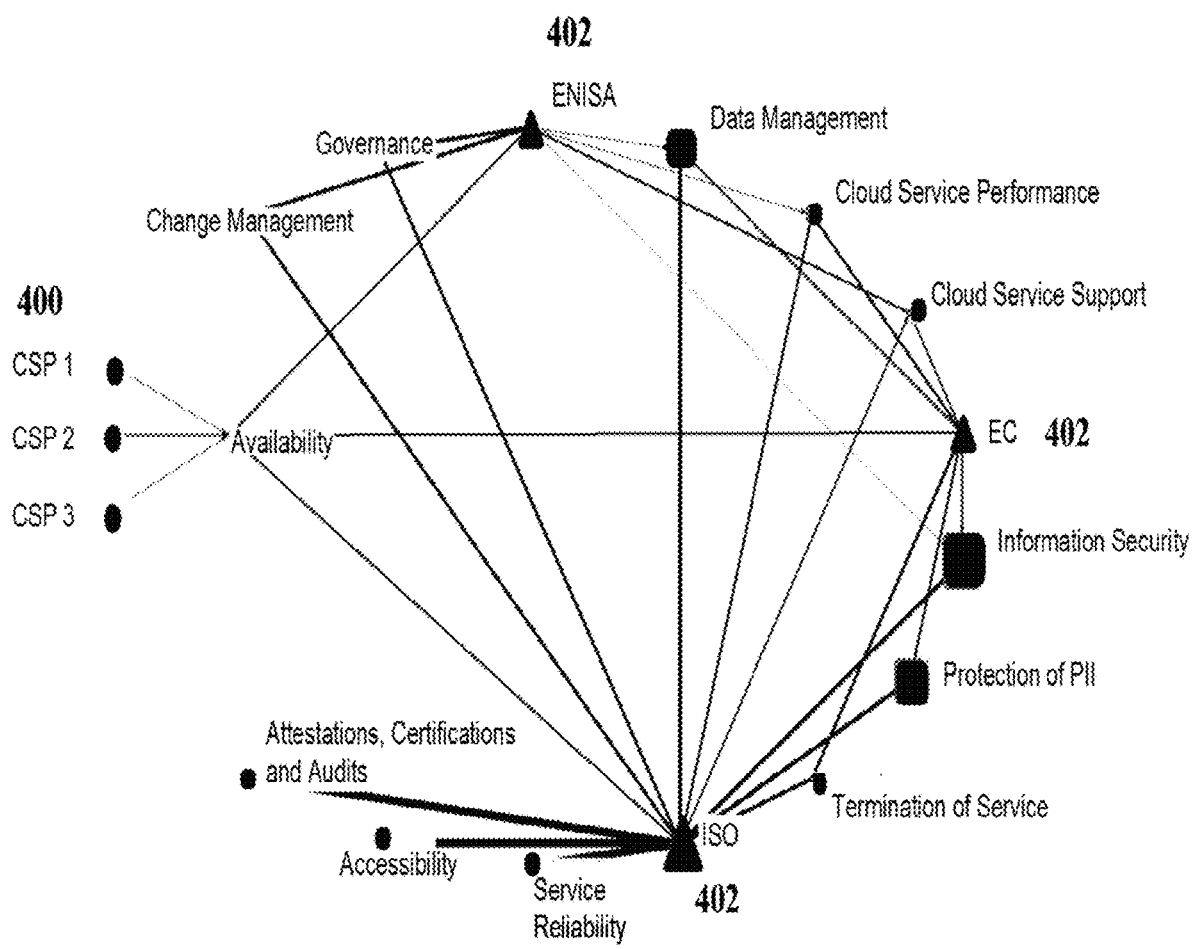
Figure 4 Relationships between Cloud SLA Standards and Organizations

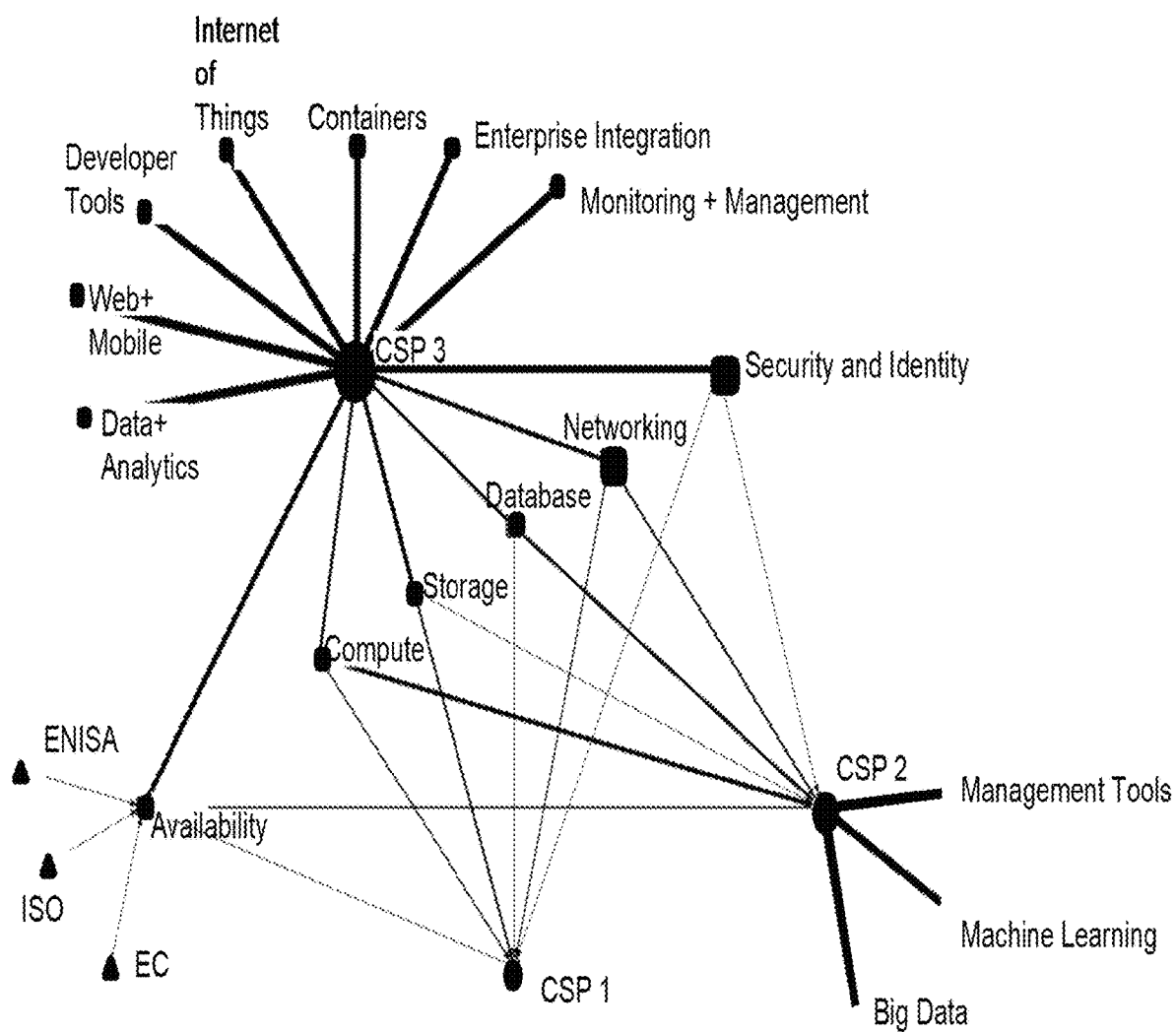
Figure 5 Relationships between CSP SLAs and Cloud SLA Standards

Figure 6 Simple Regression Model Summary

```
Call:
lm(formula = Y.Availability ~ sqrt(X.Downtime), data = SimpleDataExclude)

Residuals:
     Min       1Q   Median       3Q      Max
-0.008944 -0.001479 -0.001479 0.002008 0.006455

Coefficients:
                  Estimate Std. Error  t value Pr(>|t|)
(Intercept)      1.000e+02  4.166e-04 240045.76   <2e-16 ***
sqrt(X.Downtime) -1.661e-03  8.903e-05    -18.66   <2e-16 ***
---
Signif. codes:  0 '***' 0.001 '**' 0.01 '*' 0.05 '.' 0.1 ' ' 1

Residual standard error: 0.00285 on 81 degrees of freedom
Multiple R-squared:  0.8113,    Adjusted R-squared:  0.8089
F-statistic: 348.2 on 1 and 81 DF,  p-value: < 2.2e-16

Correlation of Coefficients:
                 (Intercept)
sqrt(X.Downtime) -0.66
```

Figure 7 ANOVA of Simple Regression Model

|  | DF | Sum Sq | Mean Sq | F value | Pr(>F) |
|---|---|---|---|---|---|
| Sqrt(X.Downtime) | 1 | 0.00282868 | 0.00282868 | 348.15 | < 2.2e-16 *** |
| Residuals | 81 | 0.00065811 | 0.00000812 | NA | NA |

Figure 8 Multiple Regression Model Summary

```
Call:
lm(formula = Y.Availability ~ X5.Performance + I(X1.Downtime *
    X2.Trust) + poly(X1.Downtime * X3.Location, degree = 2, raw = TRUE),
    data = MultDataExclude)

Residuals:
      Min         1Q     Median         3Q        Max
-0.0026343 -0.0003962 -0.0001276  0.0001167  0.0033686

Coefficients:
                                                        Estimate Std. Error   t value Pr(>|t|)
(Intercept)                                            1.000e+02  4.022e-04 248614.570  < 2e-16 ***
X5.Performance                                        -6.648e-07  2.238e-07     -2.970 0.003952 **
I(X1.Downtime * X2.Trust)                             -1.953e-04  3.845e-06    -50.791  < 2e-16 ***
poly(X1.Downtime * X3.Location, degree = 2, raw = TRUE)1  1.247e-05  5.372e-06      2.321 0.022891 *
poly(X1.Downtime * X3.Location, degree = 2, raw = TRUE)2 -8.993e-08  2.424e-08     -3.710 0.000387 ***
---
Signif. codes:  0 '***' 0.001 '**' 0.01 '*' 0.05 '.' 0.1 ' ' 1

Residual standard error: 0.0009087 on 78 degrees of freedom
Multiple R-squared:  0.9839,    Adjusted R-squared:  0.9831
F-statistic:  1193 on 4 and 78 DF,  p-value: < 2.2e-16
```

Figure 9 ANOVA of Multiple Regression Model

| | Df | Sum Sq | Mean Sq | F value | Pr(>F) |
|---|---|---|---|---|---|
| X5.Performance | 1 | 7.79E-05 | 7.79E-05 | 94.37424367 | 4.47E-15 |
| I(X1.Downtime * X2.Trust) | 1 | 0.003847096 | 0.003847096 | 4658.817379 | 2.55E-71 |
| poly(X1.Downtime * X3.Location, degree = 2, raw = TRUE) | 2 | 1.61E-05 | 8.03E-06 | 9.723244238 | 0.000169749 |
| Residuals | 78 | 6.44E-05 | 8.26E-07 | NA | NA |

PREDICTED AVAILABILITY % vs OBSERVED WITH PI AND 95% CI (SIMPLE, MULTIPLE)

SIMPLE AND MULTIPLE AVAILABILITY % (PREDICTED AND OBSERVED)

Figure 12 Linear Regression Model Measurements (simple and multiple)

| Measurement | Simple | Multiple |
| --- | --- | --- |
| Residual Standard Error | 0.0029 | 0.0009 |
| R.Squared | 0.8113 | 0.9839 |
| Adjusted.R.Squared | 0.8089 | 0.9831 |
| Predicted.R.Squared | 0.7927 | 0.9806 |
| Predictve Residual Sum of Squares (PRESS) | 7.2290e-04 | 7.7646e-05 |
| Akaike's An Information Criterion (AIC) | -733.29 | -920.19 |
| Bayesian Information Criterion (BIC) | -726.03 | -905.68 |
| Mallow's Cp | 2 | 5 |
| Root mean squared error (RMSE) | 0.0034 | 0.0010 |
| Mean Absolute Error (MAE) | 0.0024 | 0.0007 |
| Ratio of RMSE (RSR) | 0.5031 | 0.1582 |

Figure 13 ANOVA of Simple and Multiple Regression Models

Model 1: Y.Availability ~ sqrt(X.Downtime)
Model 2: Y.Availability ~ X5.Performance + I(X1.Downtime * X2.Trust) +
poly(X1.Downtime * X3.Location, degree = 2, raw = TRUE)

| | Res.Df | RSS | DF | Sum Sq | F value | Pr(>F) |
| --- | --- | --- | --- | --- | --- | --- |
| 1 | 81 | 0.00065811 | | | | |
| 2 | 78 | 0.00006179 | 3 | 0.00059632 | 250.92 | < 2.2e-16 *** |

1300      1302

Figure 14(a) Industry Cloud SLA Standards

| Content Area | Components/Requirements/Parameter Groups | Description | ISO/IEC | EC | ENISA | Total |
|---|---|---|---|---|---|---|
| Accessibility | Accessibility / / | Accessibility include assistive technologies implemented by the CSP as part of the covered services. | 1 | | | 1 |
| Attestations, Certifications and Audits | Attestations, Certifications and Audits / / | Attestations, certifications and audits represent the objectives related to methods CSPs may use to demonstrate compliance. | 1 | | | 1 |
| Availability | Availability / Availability / Service Availability | Availability of a cloud service means that it is operational and ready for use by a client program. | 1 | 1 | 1 | 3 |
| Change Management | Changes to the Cloud Service Features and Functionality / / Change Management, | Change management represents the changes made by the CSP to the features and functionality of the covered service(s) along with the corresponding process and controls to manage the lifecycle of the changes. | 1 | | 1 | 2 |

1400  1406  1402  1404

Figure 14(b) Industry Cloud SLA Standards

| | | | | | | |
|---|---|---|---|---|---|---|
| Cloud Service Performance | Cloud Service Capacity, Cloud Service Response Time, Elasticity / Capability Indicators, Capacity, Response Time / Service Elasticity and Load Tolerance | Cloud service performance encompasses components, service level objectives and metrics that can be used in a cloud SLA to express the performance of a cloud service. | 3 | 3 | 1 | 7 |
| Cloud Service Support | Cloud Service Support / Support / Incident Response | Cloud service support represents objectives related to support options (e.g. account administration, configuration, billing, answering "how to" questions, serious incidents such as service outages, security breaches and disaster recovery). | 1 | 1 | 1 | 3 |
| Data Management | Account Data, Cloud Service Customer Data, Cloud Service Provider Data, Data Deletion, Data Examination, Data Location, Data Portability, Derived Data, Intellectual Property Rights, Law Enforcement Access / Cloud Service Customer Data Mirroring and Backup and Restore, Data Classification, Data Lifecycle, Data Portability / Data Lifecycle Management | Data management defines how a cloud service deals with data and management of the data lifecycle (e.g. mirroring, backup and restore, classification, deletion, portability). | 10 | 4 | 1 | 15 |
| Governance | Governance/ / Log Management and Forensics | Governance defines the metrics, processes and standards that enable the CSP, CSC and other roles defined in ISO/IEC 17789 (ISO/IEC 17789 2014) to support and/or comply with their governance requirements. | 1 | | 1 | 2 |

Figure 14(c) Industry Cloud SLA Standards

| | | | | | | |
|---|---|---|---|---|---|---|
| Information Security | Information Security Policies, Organization of Information Security, Human Resource Security, Asset Management, Access Control, ISO Cryptography, Physical and Environmental Security, Operations Security, Communication Security, System Acquisition Development and Maintenance, Supplier Relationships, Information Security Incident Management, Informaton Security Aspects of Business Continuity Management, Compliance / Auditing and Security Verification, Authentication and Authorization, Cryptography, Governance - Service Changes, Logging and Monitoring, Security Incident Management and Reporting, Service Reliability, Vulnerability Management / Data Isolation, Technical Compliance and Vulnerability Management | ISO/IEC 27017 (ISO/IEC 27017 2015) and ISO/IEC 27018 (ISO/IEC 27018 2014) address information security for cloud services and data protection for cloud services respectively. These standards are based on security objectives and security controls contained in ISO/IEC 27002 (ISO/IEC 27002 2013). | | | | |
| | | | 14 | 8 | 2 | 24 |
| Protection of PII | Consent and choice, Purpose legitimacy and specification, Collection limitation, Data minimization, Use, retention and disclosure limitation, Accuracy and quality, Openess, transparency and notice, Individual participation and access, Accountability, Information security, Privacy compliance / Accountability, Codes of Conduct, Standards and Certification Mechanisms, Data Minimization, Geographical Location of Cloud Service Customer Data, Intervenability, Openness, Transparency and Notice, Purpose Specification, Use, Retention and Disclosure Limitation / | Personally identifiable information (PII) is used to identify the PII principal to whom the information relates. Principles for the protection of PII are set out in ISO/IEC 29100 (ISO/IEC 29100 2011) and their application for public cloud services is described in ISO/IEC 27018 (ISO/IEC 27018 2014). | | | | |
| | | | 11 | 8 | | 19 |

Figure 14(d) Industry Cloud SLA Standards

| | | | | | | |
|---|---|---|---|---|---|---|
| Service Reliability | Customer Data Backup and Restore, Disaster Recovery, Service Resilience/Fault Tolerance / / | Service reliability is an important characteristic of cloud computing systems broken down into three components: Backup and Restore, Disaster Recovery, Service Resilience / Fault Tolerance. | 3 | | | 3 |
| Termination of Service | Termination of Service / Reversibility and the Termination Process / | Termination of service deals with the orderly exit process and termination of cloud services for CSCs. | 1 | 1 | | 2 |
| Total | | | 48 | 26 | 8 | 82 |

Figure 15(a) CSA CCM and CSP Compliance

| Control Domain | Controls | CSA | CSP 1 | CSP 2 | CSP 3 |
|---|---|---|---|---|---|
| Application & Interface Security | | 9 | 8 | 8 | 8 |
| | Application Security (AIS-01.1 - 01.5) | 5 | 4 | 4 | 4 |
| | Customer Access Requirements (AIS-02.1 - 02.2) | 2 | 2 | 2 | 2 |
| | Data Integrity (AIS-03.1) | 1 | 1 | 1 | 1 |
| | Data Security / Integrity (AIS-04.1) | 1 | 1 | 1 | 1 |

1500    1504    1502

| | | | | | |
|---|---|---|---|---|---|
| Audit Assurance & Compliance | | 13 | 13 | 12 | 13 |
| | Audit Planning (AAC-01.1) | 1 | 1 | 1 | 1 |
| | Independent Audits (AAC-02.1 - AAC-02.8) | 8 | 8 | 7 | 8 |
| | Information System Regulatory Mapping (AAC-03.1 - | 4 | 4 | 4 | 4 |
| Business Continuity Management & Operational | | 23 | 21 | 20 | 21 |
| | Business Continuity Planning (BCR-01.1 - 01.2) | 2 | 1 | 1 | 1 |
| | Business Continuity Testing (BCR-02.1) | 1 | 1 | 1 | 1 |
| | Power / Telecommunications (BCR-03.1 - 03.2) | 2 | 2 | 0 | 2 |
| | Documentation (BCR-04.1) | 1 | 1 | 1 | 1 |
| | Environmental Risks (BCR-05.1) | 1 | 1 | 1 | 1 |
| | Equipment Location (BCR-06.1) | 1 | 1 | 1 | 0 |
| | Equipment Maintenance (BCR-07.1 - 07.5) | 5 | 5 | 5 | 5 |
| | Equipment Power Failures (BCR-08.1) | 1 | 1 | 1 | 1 |
| | Impact Analysis (BCR-09.1 - 09.3) | 3 | 3 | 3 | 3 |
| | Policy (BCR-10.1) | 1 | 1 | 1 | 1 |
| | Retention Policy (BCR-11.1 - 11.5) | 5 | 4 | 5 | 5 |

Figure 15(b) CSA CCM and CSP Compliance

| | | | | | |
|---|---|---|---|---|---|
| Change Control & Configuration Management | | 10 | 10 | 9 | 10 |
| | New Development / Acquisition (CCC-01.1 - 01.2) | 2 | 2 | 2 | 2 |
| | Outsourced Development (CCC-02.1 - 02.2) | 2 | 2 | 1 | 2 |
| | Quality Testing (CCC-03.1 - 03.4) | 4 | 4 | 4 | 4 |
| | Unauthorized Software Installations (CCC-04.1) | 1 | 1 | 1 | 1 |
| | Production Changes (CCC-05.1) | 1 | 1 | 1 | 1 |
| Data Security & Information Lifecycle Management | | 17 | 16 | 14 | 14 |
| | Classification (DSI-01.1 - 01.7) | 7 | 6 | 6 | 4 |
| | Data Inventory / Flows (DSI-02.1 - 02.2) | 2 | 2 | 2 | 2 |
| | E-commerce Transactions (DSI-03.1 - 03.2) | 2 | 2 | 2 | 2 |
| | Handling / Labeling / Security Policy (DSI-04.1 - 04.2) | 2 | 2 | 1 | 2 |
| | Nonproduction Data (DSI-05.1) | 1 | 1 | 1 | 1 |
| | Ownership / Stewardship (DSI-06.1) | 1 | 1 | 1 | 1 |
| | Secure Disposal (DSI-07.1 - 07.2) | 2 | 2 | 1 | 2 |
| Datacenter Security | | 11 | 11 | 10 | 11 |
| | Asset Management (DCS-01.1 - 01.2) | 2 | 2 | 2 | 2 |
| | Controlled Access Points (DCS-02.1) | 1 | 1 | 1 | 1 |
| | Equipment Identification (DCS-03.1) | 1 | 1 | 1 | 1 |
| | Offsite Authorization (DCS-04.1) | 1 | 1 | 1 | 1 |
| | Offsite Equipment (DCS-05.1) | 1 | 1 | 0 | 1 |
| | Policy (DCS-06.1 - 06.2) | 2 | 2 | 2 | 2 |
| | Secure Area Authorization (DCS-07.1) | 1 | 1 | 1 | 1 |
| | Unauthorized Persons Entry (DCS-08.1) | 1 | 1 | 1 | 1 |
| | User Access (DCS-09.1) | 1 | 1 | 1 | 1 |

Figure 15(c) CSA CCM and CSP Compliance

| Encryption & Key Management | | 14 | 14 | 13 | 13 |
|---|---|---|---|---|---|
| | Entitlement (EKM-01.1) | 1 | 1 | 1 | 1 |
| | Key Generation (EKM-02.1 - 02.5) | 5 | 5 | 4 | 4 |
| | Encryption (EKM-03.1 - 03.4) | 4 | 4 | 4 | 4 |
| | Storage and Access (EKM-04.1 - 04.4) | 4 | 4 | 4 | 4 |
| Governance and Risk Management | | 22 | 22 | 22 | 22 |
| | Baseline Requirements (GRM-01.1 - 01.3) | 3 | 3 | 3 | 3 |
| | Risk Assessments (GRM-02.1 - 02.2) | 2 | 2 | 2 | 2 |
| | Management Oversight (GRM-03.1) | 1 | 1 | 1 | 1 |
| | Management Program (GRM-04.1 - 04.2) | 2 | 2 | 2 | 2 |
| | Management Support / Involvement (GRM-05.1) | 1 | 1 | 1 | 1 |
| | Policy (GRM-06.1 - 06.4) | 4 | 4 | 4 | 4 |
| | Policy Enforcement (GRM-07.1 - 07.2) | 2 | 2 | 2 | 2 |
| | Business / Policy Change Impacts (GRM-08.1) | 1 | 1 | 1 | 1 |
| | Policy Reviews (GRM-09.1 - 09.2) | 2 | 2 | 2 | 2 |
| | Assessments (GRM-10.1 - 10.2) | 2 | 2 | 2 | 2 |
| | Program (GRM-11.1 - 11.2) | 2 | 2 | 2 | 2 |
| Human Resources | | 23 | 22 | 21 | 21 |
| | Asset Returns (HRS-01.1) | 1 | 1 | 1 | 1 |
| | Background Screening (HRS-02.1) | 1 | 1 | 1 | 1 |
| | Employment Agreements (HRS-03.1 - 03.5) | 5 | 5 | 5 | 5 |
| | Employment Termination (HRS-04.1 - 04.2) | 2 | 2 | 2 | 2 |
| | Portable / Mobile Devices (HRS-05.1) | 1 | 0 | 1 | 1 |
| | Non-Disclosure Agreements (HRS-06.1) | 1 | 1 | 1 | 1 |
| | Roles / Responsibilities (HRS-07.1) | 1 | 1 | 1 | 1 |
| | Acceptable Use (HRS-08.1 - 08.3) | 3 | 3 | 1 | 1 |
| | Training / Awareness (HRS-09.1 - 09.2) | 2 | 2 | 2 | 2 |
| | User Responsibility (HRS-10.1 - 10.3) | 3 | 3 | 3 | 3 |
| | Workspace (HRS-11.1 - 11.3) | 3 | 3 | 3 | 3 |

Figure 15(d) CSA CCM and CSP Compliance

| Identity & Access Management | | 41 | 40 | 35 | 38 |
|---|---|---|---|---|---|
| | Audit Tools Access (IAM-01.1 - 01.2) | 2 | 2 | 2 | 2 |
| | User Access Policy (IAM-02.1 - 02.2) | 2 | 2 | 2 | 2 |
| | Diagnostic / Configuration Ports Access (IAM-03.1) | 1 | 1 | 1 | 1 |
| | Policies and Procedures (IAM-04.1 - 04.2) | 2 | 2 | 2 | 2 |
| | Segregation of Duties (IAM-05.1) | 1 | 1 | 1 | 1 |
| | Source Code Access Restriction (IAM-06.1 - 06.2) | 2 | 2 | 2 | 2 |
| | Third Party Access (IAM-07.1 - 07.7) | 7 | 7 | 4 | 6 |
| | User Access Restriction / Authorization (IAM-08.1 - | 2 | 2 | 1 | 1 |
| | User Access Authorization (IAM-09.1 - 09.2) | 2 | 2 | 1 | 2 |
| | User Access Reviews (IAM-10.1 - 10.3) | 3 | 3 | 2 | 3 |
| | User Access Revocation (IAM-11.1 - 11.3) | 3 | 2 | 3 | 3 |
| | User ID Credentials (IAM-12.1 - 12.11) | 11 | 11 | 11 | 10 |
| | Utility Programs Access (IAM-13.1 - 13.3) | 3 | 3 | 3 | 3 |
| Infrastructure & Virtualization Security | | 33 | 33 | 28 | 30 |
| | Audit Logging / Intrusion Detection (IVS-01.1 - 01.5) | 5 | 5 | 5 | 5 |
| | Change Detection (IVS-02.1 - 02.2) | 2 | 2 | 2 | 2 |
| | Clock Synchronization (IVS-03.1) | 1 | 1 | 1 | 1 |
| | Capacity / Resource Planning (IVS-04.1 - 04.4) | 4 | 4 | 3 | 4 |
| | Management - Vulnerability Management (IVS-05.1) | 1 | 1 | 1 | 1 |
| | Network Security (IVS-06.1 - 06.4) | 4 | 4 | 3 | 4 |
| | OS Hardening and Base Controls (IVS-07.1) | 1 | 1 | 1 | 0 |
| | Production / Non-Production Environments (IVS-08.1 - | 3 | 3 | 3 | 3 |
| | Segmentation (IVS-09.1 - 09.4) | 4 | 4 | 4 | 4 |
| | VM Security - Data Protection (IVS-10.1 - 10.2) | 2 | 2 | 2 | 1 |
| | VMM Security - Hypervisor Hardening (IVS-11.1) | 1 | 1 | 1 | 1 |
| | Wireless Security (IVS-12.1 - 12.3) | 3 | 3 | 1 | 2 |
| | Network Architecture (IVS-13.1 - 13.2) | 2 | 2 | 1 | 2 |

Figure 15(e) CSA CCM and CSP Compliance

| Interoperability & Portability | | 8 | 8 | 8 | 8 |
|---|---|---|---|---|---|
| | APIs (IPY-01.1) | 1 | 1 | 1 | 1 |
| | Data Request (IPY-02.1) | 1 | 1 | 1 | 1 |
| | Policy & Legal (IPY-03.1 - 03.2) | 2 | 2 | 2 | 2 |
| | Standardized Network Protocols (IPY-04.1 - 04.2) | 2 | 2 | 2 | 2 |
| | Virtualization (IPY-05.1 - 05.2) | 2 | 2 | 2 | 2 |

| Mobile Security | | 29 | 0 | 27 | 0 |
|---|---|---|---|---|---|
| | Anti-Malware (MOS-01.1) | 1 | 0 | 1 | 0 |
| | Application Stores (MOS-02.1) | 1 | 0 | 1 | 0 |
| | Approved Applications (MOS-03.1) | 1 | 0 | 1 | 0 |
| | Approved Software for BYOD (MOS-04.1) | 1 | 0 | 0 | 0 |
| | Awareness and Training (MOS-05.1) | 1 | 0 | 1 | 0 |
| | Cloud Based Services (MOS-06.1) | 1 | 0 | 1 | 0 |
| | Compatibility (MOS-07.1) | 1 | 0 | 1 | 0 |
| | Device Eligibility (MOS-08.1) | 1 | 0 | 1 | 0 |
| | Device Inventory (MOS-09.1) | 1 | 0 | 1 | 0 |
| | Device Management (MOS-10.1) | 1 | 0 | 1 | 0 |
| | Encryption (MOS-11.1) | 1 | 0 | 1 | 0 |
| | Jailbreaking and Rooting (MOS-12.1 - 12.2) | 2 | 0 | 2 | 0 |
| | Legal (MOS-13.1 - 13.2) | 2 | 0 | 2 | 0 |
| | Lockout Screen (MOS-14.1) | 1 | 0 | 1 | 0 |
| | Operating Systems (MOS-15.1) | 1 | 0 | 1 | 0 |
| | Passwords (MOS-16.1 - 16.3) | 3 | 0 | 3 | 0 |
| | Policy (MOS-17.1 - 17.3) | 3 | 0 | 2 | 0 |
| | Remote Wipe (MOS-18.1 - 18.2) | 2 | 0 | 2 | 0 |
| | Security Patches (MOS-19.1 - 19.2) | 2 | 0 | 2 | 0 |
| | Users (MOS-20.1 - 20.2) | 2 | 0 | 2 | 0 |

Figure 15(f) CSA CCM and CSP Compliance

| | | | | | |
|---|---|---|---|---|---|
| Security Incident Management, E-Discovery, & Cloud Forensics | | 13 | 13 | 11 | 13 |
| | Contact / Authority Maintenance (SEF-01.1) | 1 | 1 | 1 | 1 |
| | Incident Management (SEF-02.1 - 02.4) | 4 | 4 | 3 | 4 |
| | Incident Reporting (SEF-03.1 - 03.2) | 2 | 2 | 2 | 2 |
| | Incident Response Legal Preparation (SEF-04.1 - 04.4) | 4 | 4 | 4 | 4 |
| | Incident Response Metrics (SEF-05.1 - 05.2) | 2 | 2 | 1 | 2 |
| Supply Chain Management, Transparency, and | | 20 | 18 | 16 | 20 |
| | Data Quality and Integrity (STA-01.1 - 01.2) | 2 | 0 | 0 | 2 |
| | Incident Reporting (STA-02.1) | 1 | 1 | 1 | 1 |
| | Network / Infrastructure Services (STA-03.1 - 03.2) | 2 | 2 | 1 | 2 |
| | Provider Internal Assessments (STA-04.1) | 1 | 1 | 1 | 1 |
| | Third Party Agreements (STA-05.1 - 05.5) | 5 | 5 | 4 | 5 |
| | Supply Chain Governance Reviews (STA-06.1) | 1 | 1 | 1 | 1 |
| | Supply Chain Metrics (STA-07.1 - 07.4) | 4 | 4 | 4 | 4 |
| | Third Party Assessment (STA-08.1 - 08.2) | 2 | 2 | 2 | 2 |
| | Third Party Audits (STA-09.1 - 09.2) | 2 | 2 | 2 | 2 |
| Threat and Vulnerability Management | | 10 | 8 | 5 | 9 |
| | Antivirus / Malicious Software (TVM-01.1 - 01.2) | 2 | 2 | 1 | 2 |
| | Vulnerability / Patch Management (TVM-02.1 - 02.6) | 6 | 6 | 4 | 5 |
| | Mobile Code (TVM-03.1 - 03.2) | 2 | 0 | 0 | 2 |
| Total | | 296 | 257 | 259 | 251 |
| | | | 86.82% | 87.50% | 85% |

Figure 16(a) Cloud SLA Standard Content Areas to CCM and CAIQ

| Cloud SLA Standard Content Areas (CA) | Content Area Descriptions | CCM Control Domains per CA | Total CAIQs per CA | CSP CAIQ Compliance per CA | | | | | |
|---|---|---|---|---|---|---|---|---|---|
| | | | | CSP 1 | | CSP 2 | | CSP 3 | |
| Accessibility | Accessibility include assistive technologies implemented by the CSP as part of the covered services. | No direct Control Domain mapping | 0 | 0 | | 0 | | 0 | |
| 1600 | 1602 | 1604 | | 1606 | | | | | |
| Attestations, Certifications and Audits | Attestations, certifications and audits represent the objectives related to methods CSPs may use to demonstrate compliance. | Audit Assurance & Compliance | 13 | 13 | 1.0000 | 12 | 0.9231 | 13 | 1.0000 |
| Availability | Availability reflects the properties of a cloud service being accessible and usable upon demand by an authorized entity. | No direct Control Domain mapping | 0 | 0 | | 0 | | 0 | |
| Change Management | Change management represents the changes made by the CSP to the features and functionality of the covered service(s) along with the corresponding process and controls to manage the lifecycle of the changes. | Change Control & Configuration Management | 10 | 10 | 1.0000 | 9 | 0.9000 | 10 | 1.0000 |

Figure 16(b) Cloud SLA Standard Content Areas to CCM and CAIQ

| | | | | | | | | | |
|---|---|---|---|---|---|---|---|---|---|
| Cloud Service Support | Cloud service support represents objectives related to support options (e.g. account administration, configuration, billing, answering "how to" questions, serious incidents such as service outages, security breaches and disaster recovery). | Security Incident Management, E-Discovery, & Cloud Forensics | 13 | 13 | 1.0000 | 11 | 0.8462 | 13 | 1.0000 |
| Cloud Service Performance | Cloud service performance encompasses components, service level objectives and metrics that can be used in a cloud SLA to express the performance of a cloud service. | Infrastructure & Virtualization Security | 33 | 33 | 1.0000 | 28 | 0.8485 | 30 | 0.9091 |
| Data Management | Data management defines how a cloud service deals with data and management of the data lifecycle (e.g. mirroring, backup and restore, classification, deletion, portability). | Data Security & Information Lifecycle Management | 17 | 16 | 0.9412 | 14 | 0.8235 | 14 | 0.8235 |

Figure 16(c) Cloud SLA Standard Content Areas to CCM and CAIQ

| Governance | Governance defines the metrics, processes and standards that enable the CSP, CSC and other roles defined in ISO/IEC 17789 (ISO/IEC 17789 2014) to support and/or comply with their governance requirements. | Governance and Risk Management | | | | | | | |
|---|---|---|---|---|---|---|---|---|---|
| | | | 22 | 22 | 1.0000 | 22 | 1.0000 | 22 | 1.0000 |
| Information Security | ISO/IEC 27017 (ISO/IEC 27017 2015) and ISO/IEC 27018 (ISO/IEC 27018 2014) address information security for cloud services and data protection for cloud services respectively. These standards are based on security objectives and security controls contained in ISO/IEC 27002 (ISO/IEC 27002 2013). | Audit Assurance & Compliance | 13 | 13 | | 12 | | 13 | |
| | | Data Security & Information Lifecycle Management | 17 | 16 | | 14 | | 14 | |
| | | Encryption & Key Management | 14 | 14 | | 13 | | 13 | |
| | | Governance and Risk Management | 22 | 22 | | 22 | | 22 | |
| | | Identity & Access Management | 41 | 40 | | 35 | | 38 | |
| | | Infrastructure & Virtualization Security | 33 | 33 | | 28 | | 30 | |
| | | Security Incident Management, E-Discovery, & Cloud Forensics | 13 | 13 | | 11 | | 13 | |
| | | Threat and Vulnerability Management | 10 | 8 | 0.9755 | 5 | 0.8589 | 9 | 0.9325 |

Figure 16(d) Cloud SLA Standard Content Areas to CCM and CAIQ

| | | | | | | | | | |
|---|---|---|---|---|---|---|---|---|---|
| Protection of PII | Personally identifiable information (PII) is used to identify the PII principal to whom the information relates. Principles for the protection of PII are set out in ISO/IEC 29100 (ISO/IEC 29100 2011) and their application for public cloud services is described in ISO/IEC 27018 (ISO/IEC 27018 2014). | Application & Interface Security | 9 | 8 | | 8 | | 8 | |
| | | Data Security & Information Lifecycle Management | 17 | 16 | | 14 | | 14 | |
| | | Human Resources | 23 | 22 | 0.9388 | 21 | 0.8776 | 21 | 0.8776 |
| Service Reliability | Service reliability is an important characteristic of cloud computing systems broken down into three components: Backup and Restore, Disaster Recovery, Service Resilience / Fault Tolerance. | Business Continuity Management & Operational Resilience | 23 | 21 | 0.9130 | 20 | 0.8696 | 21 | 0.9130 |
| Termination of Service | Termination of service deals with the orderly exit process and termination of cloud services for CSCs. | No direct Control Domain mapping | 0 | 0 | | 0 | | 0 | |

Figure 16(e) Cloud SLA Standard Content Areas to CCM and CAIQ

| Capability outside SLA CAs | No direct Content Area mapping | Datacenter Security | 11 | 11 | | 10 | | 11 | |
|---|---|---|---|---|---|---|---|---|---|
| | | Interoperability & Portability | 8 | 8 | | 8 | | 8 | |
| | | Mobile Security | 29 | 0 | | 27 | | 0 | |
| | | Supply Chain Management, Transparency, and Accountability | 20 | 18 | 0.5441 | 16 | 0.8971 | 20 | 0.5735 |

Figure 17 CSP Compute Service Availability

| CSP Compute Service Availability Performance | CSP Compute Service Availability | | |
|---|---|---|---|
| | CSP 1 | CSP 2 | CSP 3 |
| 2015 total service region availability | 99.9853% | 99.9208% | 99.9157% |
| 2016 total service region availability | 99.9792% | 99.9858% | 99.9581% |
| 2017 total service region availability | 99.9834% | 99.9821% | 99.8290% |
| Average historical availability (3 year) | 0.9998 | 0.9996 | 0.9990 |

Figure 18 CSP Compute Service Region Availability

| CSP Service Region | Downtime Minutes (planned + unplanned) | | | CSP Service Region | Downtime Minutes (planned + unplanned) | | |
|---|---|---|---|---|---|---|---|
| CSP 3 | 2017 | 2016 | 2015 | CSP 1 | 2017 | 2016 | 2015 |
| asia-east | 114.6 | 0 | 17.4 | ap-northeast-1 | 0 | 0 | 9.62 |
| asia-southeast | 123 | 58.42 | 22.88 | ap-northeast-2 | 4.17 | | |
| australia-east | 20.47 | | | ap-south-1 | 0 | | |
| australia-southeast | 0 | | | ap-southeast-1 | 55.12 | 1.57 | 0 |
| brazil-south | 0 | 12.67 | 20.67 | ap-southeast-2 | 0 | 103.8 | 7.27 |
| canada-central | 3.88 | | | ca-central-1 | 0 | | |
| canada-east | 0 | | | eu-central-1 | 0 | 0 | 0.73 |
| eu-north | 20.88 | 20.1 | 31.57 | eu-west-1 | 7.63 | 0 | 0 |
| eu-west | 0 | 11.02 | 2.54 | eu-west-2 | 0 | | |
| india-central | 0 | | | sa-east-1 | 6.55 | 4.1 | 59.52 |
| india-south | 0 | | | us-east-1 | 0 | 0 | 0 |
| india-west | 0 | | | us-east-2 | 0 | | |
| japan-east | 0 | 16.25 | 25.38 | us-west-1 | 0 | 0 | 0 |
| japan-west | 0 | 52.35 | 21.95 | us-west-2 | 13.67 | 0 | 0 |
| korea-central | 36.75 | | | Total Downtime | 87.14 | 109.47 | 77.1433 |
| korea-south | 0 | | | | | | |
| uk-south | 9.9 | | | | | | |
| uk-west | 0 | | | CSP 2 | 2017 | 2016 | 2015 |
| us-central | 9.6 | 0 | 147 | asia-east1 | 5.65 | 16.82 | 129 |
| us-east | 67.8 | 0 | 79.8 | asia-northeast1 | 53.03 | | |
| us-east2 | 0 | 0 | 33.3 | asia-south1 | | | |
| us-northcentral | 126.6 | 16.45 | 15.75 | asia-southeast1 | 0 | | |
| us-southcentral | 0 | 11.2 | 24.67 | australia-southeast1 | 0 | | |
| us-west | 4.57 | 21.72 | 0 | europe-west1 | 0 | 25.32 | 144 |
| us-west2 | 335.4 | | | europe-west2 | 0 | | |
| us-westcentral | 25.52 | | | europe-west3 | | | |
| Total Downtime | 898.97 | 220.18 | 442.91 | southamerica-east1 | | | |
| | | | | us-central1 | 0 | 16.03 | 143.4 |
| | | | | us-east1 | 0 | 16.25 | |
| | | | | us-east4 | 0 | | |
| | | | | us-west1 | 35.58 | | |
| | | | | Total Downtime | 94.26 | 74.42 | 416.4 |

Figure 19 SLA Content Area capability ratios per CCM and CAIQ

| Cloud SLA Content Area (CA) | Content Area Capability Ratios | Total Control Domains per CA | Control Domain Ratio per CA | Total Controls per CA | Control Ratio per CA | Total CAIQs per CA | CAIQ Ratio per CA |
|---|---|---|---|---|---|---|---|
| Accessibility[1] | 0.0769 | 0 | 0.00 | 0 | 0.00 | 0 | 0.00 |
| Attestations, Certifications and Audits | 0.0278 | 1 | 0.05 | 3 | 0.02 | 13 | 0.03 |
| Availability[3] | 0.1154 | 0 | 0.00 | 0 | 0.00 | 0 | 0.00 |
| Change Management | 0.0261 | 1 | 0.05 | 5 | 0.03 | 10 | 0.02 |
| Cloud Service Performance | 0.0768 | 1 | 0.05 | 13 | 0.07 | 33 | 0.08 |
| Cloud Service Support | 0.0310 | 1 | 0.05 | 5 | 0.03 | 13 | 0.03 |
| Data Management | 0.0408 | 1 | 0.05 | 7 | 0.04 | 17 | 0.04 |
| Governance | 0.0556 | 1 | 0.05 | 11 | 0.06 | 22 | 0.05 |
| Information Security | 0.3758 | 8 | 0.36 | 59 | 0.33 | 163 | 0.40 |
| Protection of PII | 0.1209 | 3 | 0.14 | 22 | 0.12 | 49 | 0.12 |
| Service Reliability | 0.0572 | 1 | 0.05 | 11 | 0.06 | 23 | 0.06 |
| Termination of Service[2] | 0.0769 | 0 | 0.00 | 0 | 0.00 | 0 | 0.00 |
| Capability outside SLA CAs[4] | 0.0940 | 4 | 0.18 | 43 | 0.24 | 68 | 0.17 |
|  | 1 | 22 | 1 | 179 | 1 | 411 | 1 |
| [1,2,3] No CCM / CAIQ mapping, apply average ratios per CA: | 2 | 0.0769 | 14 | 0.0769 | 32 | 0.0769 | |

[3] Key CSP SLA metric, increase impact on CA capability ratio by: 50%

[4] No SLA CA mapping, reduce impact on CA capability ratio by: 50%

Figure 20 CSP capability ratios per SLA Content Area

| Cloud SLA Content Areas (CA) | CSP SLA Capability Ratios | | |
|---|---|---|---|
| | CSP 1 | CSP 2 | CSP 3 |
| Accessibility[1] (Acc) | 0.0692 | 0.0674 | 0.0668 |
| Attestations, Certifications and Audits (ACA) | 0.0316 | 0.0292 | 0.0316 |
| Availability[3] (Avail) | 0.9998 | 0.9996 | 0.9990 |
| Change Management (Chg Man) | 0.0243 | 0.0219 | 0.0243 |
| Cloud Service Performance (CS Perf) | 0.0803 | 0.0681 | 0.0730 |
| Cloud Service Support (CS Supp) | 0.0316 | 0.0268 | 0.0316 |
| Data Management (Data Man) | 0.0389 | 0.0341 | 0.0341 |
| Governance (Gov) | 0.0535 | 0.0535 | 0.0535 |
| Information Security (Info Sec) | 0.3869 | 0.3406 | 0.3698 |
| Protection of PII (Pro PII) | 0.1119 | 0.1046 | 0.1046 |
| Service Reliability (Svc Rel) | 0.0511 | 0.0487 | 0.0511 |
| Termination of Service[2] (Term Svc) | 0.0692 | 0.0674 | 0.0668 |
| Capability outside SLA CAs (Outside CA) | 0.0419 | 0.0690 | 0.0441 |
| [1,2] *No CAIQ mapping, apply CAIQ average compliance ratio:* | *0.9002* | *0.8759* | *0.8686* |

[3] *Based on actual CSP performance*

Figure 21 Comparison Matrix for SLA Content Area capability criteria

| | Acc | ACA | Avail | Chg Man | CS Perf | CS Supp | Data Man | Gov | Info Sec | Pro PII | Svc Rel | Term Svc | Outside CA |
|---|---|---|---|---|---|---|---|---|---|---|---|---|---|
| Accessibility[1] (Acc) | 1.0000 | 2.7692 | 0.6667 | 2.9423 | 1.0016 | 2.4777 | 1.8831 | 1.3846 | 0.2047 | 0.6362 | 1.3451 | 1.0000 | 0.8187 |
| Attestations, Certifications and Audits (ACA) | 0.3611 | 1.0000 | 0.2407 | 1.0625 | 0.3617 | 0.8947 | 0.6800 | 0.5000 | 0.0739 | 0.2297 | 0.4857 | 0.3611 | 0.2957 |
| Availability[2] (Avail) | 1.5000 | 4.1538 | 1.0000 | 4.4135 | 1.5025 | 3.7166 | 2.8246 | 2.0769 | 0.3070 | 0.9543 | 2.0176 | 1.5000 | 1.2281 |
| Change Management (Chg Man) | 0.3399 | 0.9412 | 0.2266 | 1.0000 | 0.3404 | 0.8421 | 0.6400 | 0.4706 | 0.0696 | 0.2162 | 0.4571 | 0.3399 | 0.2783 |
| Cloud Service Performance (CS Perf) | 0.9984 | 2.7647 | 0.6656 | 2.9375 | 1.0000 | 2.4737 | 1.8800 | 1.3824 | 0.2043 | 0.6351 | 1.3429 | 0.9984 | 0.8174 |
| Cloud Service Support (CS Supp) | 0.4036 | 1.1176 | 0.2691 | 1.1875 | 0.4043 | 1.0000 | 0.7600 | 0.5588 | 0.0826 | 0.2568 | 0.5429 | 0.4036 | 0.3304 |
| Data Management (Data Man) | 0.5310 | 1.4706 | 0.3540 | 1.5625 | 0.5319 | 1.3158 | 1.0000 | 0.7353 | 0.1087 | 0.3378 | 0.7143 | 0.5310 | 0.4348 |
| Governance (Gov) | 0.7222 | 2.0000 | 0.4815 | 2.1250 | 0.7234 | 1.7895 | 1.3600 | 1.0000 | 0.1478 | 0.4595 | 0.9714 | 0.7222 | 0.5913 |
| Information Security (Info Sec) | 4.8856 | 13.5294 | 3.2571 | 14.3750 | 4.8936 | 12.1053 | 9.2000 | 6.7647 | 1.0000 | 3.1081 | 6.5714 | 4.8856 | 4.0000 |
| Protection of PII (Pro PII) | 1.5719 | 4.3529 | 1.0479 | 4.6250 | 1.5745 | 3.8947 | 2.9600 | 2.1765 | 0.3217 | 1.0000 | 2.1143 | 1.5719 | 1.2870 |
| Service Reliability (Svc Rel) | 0.7435 | 2.0588 | 0.4956 | 2.1875 | 0.7447 | 1.8421 | 1.4000 | 1.0294 | 0.1522 | 0.4730 | 1.0000 | 0.7435 | 0.6087 |
| Termination of Service (Term Svc) | 1.0000 | 2.7692 | 0.6667 | 2.9423 | 1.0016 | 2.4777 | 1.8831 | 1.3846 | 0.2047 | 0.6362 | 1.3451 | 1.0000 | 0.8187 |
| Capability outside SLA CAs (Outside CA) | 1.2214 | 3.3824 | 0.8143 | 3.5938 | 1.2234 | 3.0263 | 2.3000 | 1.6912 | 0.2500 | 0.7770 | 1.6429 | 1.2214 | 1.0000 |
| sum | 15.2786 | 42.3100 | 10.1857 | 44.9543 | 15.3036 | 37.8563 | 28.7708 | 21.1550 | 3.1273 | 9.7199 | 20.5505 | 15.2786 | 12.5090 |

Figure 22 Priority Vector for SLA Content Area capability criteria

| | Acc | ACA | Avail | Chg Man | CS Perf | CS Supp | Data Man | Gov | Info Sec | Pro PII | Svc Rel | Term Svc | Outside CA | PV = |
|---|---|---|---|---|---|---|---|---|---|---|---|---|---|---|
| Accessibility[1] (Acc) | 0.0655 | 0.0655 | 0.0655 | 0.0655 | 0.0655 | 0.0655 | 0.0655 | 0.0655 | 0.0655 | 0.0655 | 0.0655 | 0.0655 | 0.0655 | 0.0655 |
| Attestations, Certifications and Audits (ACA) | 0.0236 | 0.0236 | 0.0236 | 0.0236 | 0.0236 | 0.0236 | 0.0236 | 0.0236 | 0.0236 | 0.0236 | 0.0236 | 0.0236 | 0.0236 | 0.0236 |
| Availability[3] (Avail) | 0.0982 | 0.0982 | 0.0982 | 0.0982 | 0.0982 | 0.0982 | 0.0982 | 0.0982 | 0.0982 | 0.0982 | 0.0982 | 0.0982 | 0.0982 | 0.0982 |
| Change Management (Chg Man) | 0.0222 | 0.0222 | 0.0222 | 0.0222 | 0.0222 | 0.0222 | 0.0222 | 0.0222 | 0.0222 | 0.0222 | 0.0222 | 0.0222 | 0.0222 | 0.0222 |
| Cloud Service Performance (CS Perf) | 0.0653 | 0.0653 | 0.0653 | 0.0653 | 0.0653 | 0.0653 | 0.0653 | 0.0653 | 0.0653 | 0.0653 | 0.0653 | 0.0653 | 0.0653 | 0.0653 |
| Cloud Service Support (CS Supp) | 0.0264 | 0.0264 | 0.0264 | 0.0264 | 0.0264 | 0.0264 | 0.0264 | 0.0264 | 0.0264 | 0.0264 | 0.0264 | 0.0264 | 0.0264 | 0.0264 |
| Data Management (Data Man) | 0.0348 | 0.0348 | 0.0348 | 0.0348 | 0.0348 | 0.0348 | 0.0348 | 0.0348 | 0.0348 | 0.0348 | 0.0348 | 0.0348 | 0.0348 | 0.0348 |
| Governance (Gov) | 0.0473 | 0.0473 | 0.0473 | 0.0473 | 0.0473 | 0.0473 | 0.0473 | 0.0473 | 0.0473 | 0.0473 | 0.0473 | 0.0473 | 0.0473 | 0.0473 |
| Information Security (Info Sec) | 0.3198 | 0.3198 | 0.3198 | 0.3198 | 0.3198 | 0.3198 | 0.3198 | 0.3198 | 0.3198 | 0.3198 | 0.3198 | 0.3198 | 0.3198 | 0.3198 |
| Protection of PII (Pro PII) | 0.1029 | 0.1029 | 0.1029 | 0.1029 | 0.1029 | 0.1029 | 0.1029 | 0.1029 | 0.1029 | 0.1029 | 0.1029 | 0.1029 | 0.1029 | 0.1029 |
| Service Reliability (Svc Rel) | 0.0487 | 0.0487 | 0.0487 | 0.0487 | 0.0487 | 0.0487 | 0.0487 | 0.0487 | 0.0487 | 0.0487 | 0.0487 | 0.0487 | 0.0487 | 0.0487 |
| Termination of Service[2] (Term Svc) | 0.0655 | 0.0655 | 0.0655 | 0.0655 | 0.0655 | 0.0655 | 0.0655 | 0.0655 | 0.0655 | 0.0655 | 0.0655 | 0.0655 | 0.0655 | 0.0655 |
| Capability outside SLA CAs (Outside CA) | 0.0799 | 0.0799 | 0.0799 | 0.0799 | 0.0799 | 0.0799 | 0.0799 | 0.0799 | 0.0799 | 0.0799 | 0.0799 | 0.0799 | 0.0799 | 0.0799 |
| sum | 1.0000 | 1.0000 | 1.0000 | 1.0000 | 1.0000 | 1.0000 | 1.0000 | 1.0000 | 1.0000 | 1.0000 | 1.0000 | 1.0000 | 1.0000 | |

[1,2] No CAIQ mapping

[3] Based on actual CSP performance (Gartner 2017)

Figure 23(a) CSP Priority Vectors for SLA Content Areas

Priority Vector (normalized principle Eigenvector): Accessibility

|       | CSP 1  | CSP 2  | CSP 3  | PV =   |
|-------|--------|--------|--------|--------|
| CSP 1 | 0.3404 | 0.3404 | 0.3404 | 0.3404 |
| CSP 2 | 0.3312 | 0.3312 | 0.3312 | 0.3312 |
| CSP 3 | 0.3284 | 0.3284 | 0.3284 | 0.3284 |
| sum   | 1.0000 | 1.0000 | 1.0000 |        |

Priority Vector (normalized principle Eigen Vector): Attestations, Certifications and Audits

|       | CSP 1  | CSP 2  | CSP 3  | PV =   |
|-------|--------|--------|--------|--------|
| CSP 1 | 0.3421 | 0.3421 | 0.3421 | 0.3421 |
| CSP 2 | 0.3158 | 0.3158 | 0.3158 | 0.3158 |
| CSP 3 | 0.3421 | 0.3421 | 0.3421 | 0.3421 |
| sum   | 1.0000 | 1.0000 | 1.0000 |        |

Priority Vector (normalized principle Eigenvector): Availability

|       | CSP 1  | CSP 2  | CSP 3  | PV =   |
|-------|--------|--------|--------|--------|
| CSP 1 | 0.3334 | 0.3334 | 0.3334 | 0.3334 |
| CSP 2 | 0.3334 | 0.3334 | 0.3334 | 0.3334 |
| CSP 3 | 0.3332 | 0.3332 | 0.3332 | 0.3332 |
| sum   | 1.0000 | 1.0000 | 1.0000 |        |

Priority Vector (normalized principle Eigenvector): Change Management

|       | CSP 1  | CSP 2  | CSP 3  | PV =   |
|-------|--------|--------|--------|--------|
| CSP 1 | 0.3448 | 0.3448 | 0.3448 | 0.3448 |
| CSP 2 | 0.3103 | 0.3103 | 0.3103 | 0.3103 |
| CSP 3 | 0.3448 | 0.3448 | 0.3448 | 0.3448 |
| sum   | 1.0000 | 1.0000 | 1.0000 |        |

Priority Vector (normalized principle Eigenvector): Cloud Service Performance

|       | CSP 1  | CSP 2  | CSP 3  | PV =   |
|-------|--------|--------|--------|--------|
| CSP 1 | 0.3626 | 0.3626 | 0.3626 | 0.3626 |
| CSP 2 | 0.3077 | 0.3077 | 0.3077 | 0.3077 |
| CSP 3 | 0.3297 | 0.3297 | 0.3297 | 0.3297 |
| sum   | 1.0000 | 1.0000 | 1.0000 |        |

Priority Vector (normalized principle Eigen Vector): Cloud Service Support

|       | CSP 1  | CSP 2  | CSP 3  | PV =   |
|-------|--------|--------|--------|--------|
| CSP 1 | 0.3514 | 0.3514 | 0.3514 | 0.3514 |
| CSP 2 | 0.2973 | 0.2973 | 0.2973 | 0.2973 |
| CSP 3 | 0.3514 | 0.3514 | 0.3514 | 0.3514 |
| sum   | 1.0000 | 1.0000 | 1.0000 |        |

Figure 23(b) CSP Priority Vectors for SLA Content Areas

Priority Vector (normalized principle Eigenvector): Data Management

|       | CSP 1  | CSP 2  | CSP 3  | PV =   |
|-------|--------|--------|--------|--------|
| CSP 1 | 0.3636 | 0.3636 | 0.3636 | 0.3636 |
| CSP 2 | 0.3182 | 0.3182 | 0.3182 | 0.3182 |
| CSP 3 | 0.3182 | 0.3182 | 0.3182 | 0.3182 |
| sum   | 1.0000 | 1.0000 | 1.0000 |        |

Priority Vector (normalized principle Eigenvector): Governance

|       | CSP 1  | CSP 2  | CSP 3  | PV =   |
|-------|--------|--------|--------|--------|
| CSP 1 | 0.3333 | 0.3333 | 0.3333 | 0.3333 |
| CSP 2 | 0.3333 | 0.3333 | 0.3333 | 0.3333 |
| CSP 3 | 0.3333 | 0.3333 | 0.3333 | 0.3333 |
| sum   | 1.0000 | 1.0000 | 1.0000 |        |

Priority Vector (normalized principle Eigenvector): Information Security

|       | CSP 1  | CSP 2  | CSP 3  | PV =   |
|-------|--------|--------|--------|--------|
| CSP 1 | 0.3525 | 0.3525 | 0.3525 | 0.3525 |
| CSP 2 | 0.3104 | 0.3104 | 0.3104 | 0.3104 |
| CSP 3 | 0.3370 | 0.3370 | 0.3370 | 0.3370 |
| sum   | 1.0000 | 1.0000 | 1.0000 |        |

Priority Vector (normalized principle Eigenvector): Protection PII

|       | CSP 1  | CSP 2  | CSP 3  | PV =   |
|-------|--------|--------|--------|--------|
| CSP 1 | 0.3485 | 0.3485 | 0.3485 | 0.3485 |
| CSP 2 | 0.3258 | 0.3258 | 0.3258 | 0.3258 |
| CSP 3 | 0.3258 | 0.3258 | 0.3258 | 0.3258 |
| sum   | 1.0000 | 1.0000 | 1.0000 |        |

Priority Vector (normalized principle Eigenvector): Service Reliability

|       | CSP 1  | CSP 2  | CSP 3  | PV =   |
|-------|--------|--------|--------|--------|
| CSP 1 | 0.3387 | 0.3387 | 0.3387 | 0.3387 |
| CSP 2 | 0.3226 | 0.3226 | 0.3226 | 0.3226 |
| CSP 3 | 0.3387 | 0.3387 | 0.3387 | 0.3387 |
| sum   | 1.0000 | 1.0000 | 1.0000 |        |

Figure 23(c) CSP Priority Vectors for SLA Content Areas

Priority Vector (normalized principle Eigenvector): Termination of Service

|       | CSP 1  | CSP 2  | CSP 3  | PV =   |
|-------|--------|--------|--------|--------|
| CSP 1 | 0.3404 | 0.3404 | 0.3404 | 0.3404 |
| CSP 2 | 0.3312 | 0.3312 | 0.3312 | 0.3312 |
| CSP 3 | 0.3284 | 0.3284 | 0.3284 | 0.3284 |
| sum   | 1.0000 | 1.0000 | 1.0000 |        |

Priority Vector (normalized principle Eigenvector): Capability outside SLA CAs

|        | CSP 1  | CSP 2  | CSP 3  | PV =   |
|--------|--------|--------|--------|--------|
| CSP 1  | 0.2701 | 0.2701 | 0.2701 | 0.2701 |
| Google | 0.4453 | 0.4453 | 0.4453 | 0.4453 |
| CSP 3  | 0.2847 | 0.2847 | 0.2847 | 0.2847 |
| sum    | 1.0000 | 1.0000 | 1.0000 |        |

Figure 24(a) CSP Comparison Matrices for SLA Content Areas

Comparison Matrix for Content Area: Accessibility

|        |       | CSP 1  | CSP 2  | CSP 3  |
|--------|-------|--------|--------|--------|
|        | CSP 1 | 1.0000 | 1.0278 | 1.0364 |
| CM =   | CSP 2 | 0.9730 | 1.0000 | 1.0084 |
|        | CSP 3 | 0.9649 | 0.9917 | 1.0000 |
|        | sum   | 2.9378 | 3.0194 | 3.0448 |

Comparison Matrix for Content Area: Attestations, Certifications and Audits

|        |       | CSP 1  | CSP 2  | CSP 3  |
|--------|-------|--------|--------|--------|
|        | CSP 1 | 1.0000 | 1.0833 | 1.0000 |
| CM =   | CSP 2 | 0.9231 | 1.0000 | 0.9231 |
|        | CSP 3 | 1.0000 | 1.0833 | 1.0000 |
|        | sum   | 2.9231 | 3.1667 | 2.9231 |

Comparison Matrix for Content Area: Availability

|        |       | CSP 1  | CSP 2  | CSP 3  |
|--------|-------|--------|--------|--------|
|        | CSP 1 | 1.0000 | 1.0002 | 1.0008 |
| CM =   | CSP 2 | 0.9998 | 1.0000 | 1.0006 |
|        | CSP 3 | 0.9992 | 0.9994 | 1.0000 |
|        | sum   | 2.9990 | 2.9996 | 3.0014 |

Comparison Matrix for Content Area: Change Management

|        |       | CSP 1  | CSP 2  | CSP 3  |
|--------|-------|--------|--------|--------|
|        | CSP 1 | 1.0000 | 1.1111 | 1.0000 |
| CM =   | CSP 2 | 0.9000 | 1.0000 | 0.9000 |
|        | CSP 3 | 1.0000 | 1.1111 | 1.0000 |
|        | sum   | 2.9000 | 3.2222 | 2.9000 |

Comparison Matrix for Content Area: Cloud Service Performance

|        |       | CSP 1  | CSP 2  | CSP 3  |
|--------|-------|--------|--------|--------|
|        | CSP 1 | 1.0000 | 1.1786 | 1.1000 |
| CM =   | CSP 2 | 0.8485 | 1.0000 | 0.9333 |
|        | CSP 3 | 0.9091 | 1.0714 | 1.0000 |
|        | sum   | 2.7576 | 3.2500 | 3.0333 |

Comparison Matrix for Content Area: Cloud Service Support

|        |       | CSP 1  | CSP 2  | CSP 3  |
|--------|-------|--------|--------|--------|
|        | CSP 1 | 1.0000 | 1.1818 | 1.0000 |
| CM =   | CSP 2 | 0.8462 | 1.0000 | 0.8462 |
|        | CSP 3 | 1.0000 | 1.1818 | 1.0000 |
|        | sum   | 2.8462 | 3.3636 | 2.8462 |

Figure 24(b) CSP Comparison Matrices for SLA Content Areas

Comparison Matrix for Content Area: Data Management

|  |  | CSP 1 | CSP 2 | CSP 3 |
|---|---|---|---|---|
|  | CSP 1 | 1.0000 | 1.1429 | 1.1429 |
| CM = | CSP 2 | 0.8750 | 1.0000 | 1.0000 |
|  | CSP 3 | 0.8750 | 1.0000 | 1.0000 |
|  | sum | 2.7500 | 3.1429 | 3.1429 |

Comparison Matrix for Content Area: Governance

|  |  | CSP 1 | CSP 2 | CSP 3 |
|---|---|---|---|---|
|  | CSP 1 | 1.0000 | 1.0000 | 1.0000 |
| CM = | CSP 2 | 1.0000 | 1.0000 | 1.0000 |
|  | CSP 3 | 1.0000 | 1.0000 | 1.0000 |
|  | sum | 3.0000 | 3.0000 | 3.0000 |

Comparison Matrix for Content Area: Information Security

|  |  | CSP 1 | CSP 2 | CSP 3 |
|---|---|---|---|---|
|  | CSP 1 | 1.0000 | 1.1357 | 1.0461 |
| CM = | CSP 2 | 0.8805 | 1.0000 | 0.9211 |
|  | CSP 3 | 0.9560 | 1.0857 | 1.0000 |
|  | sum | 2.8365 | 3.2214 | 2.9671 |

Comparison Matrix for Content Area: Protection PII

|  |  | CSP 1 | CSP 2 | CSP 3 |
|---|---|---|---|---|
|  | CSP 1 | 1.0000 | 1.0698 | 1.0698 |
| CM = | CSP 2 | 0.9348 | 1.0000 | 1.0000 |
|  | CSP 3 | 0.9348 | 1.0000 | 1.0000 |
|  | sum | 2.8696 | 3.0698 | 3.0698 |

Comparison Matrix for Content Area: Service Reliability

|  |  | CSP 1 | CSP 2 | CSP 3 |
|---|---|---|---|---|
|  | CSP 1 | 1.0000 | 1.0500 | 1.0000 |
| CM = | CSP 2 | 0.9524 | 1.0000 | 0.9524 |
|  | CSP 3 | 1.0000 | 1.0500 | 1.0000 |
|  | sum | 2.9524 | 3.1000 | 2.9524 |

Comparison Matrix for Content Area: Termination of Service

|  |  | CSP 1 | CSP 2 | CSP 3 |
|---|---|---|---|---|
|  | CSP 1 | 1.0000 | 1.0278 | 1.0364 |
| CM = | CSP 2 | 0.9730 | 1.0000 | 1.0084 |
|  | CSP 3 | 0.9649 | 0.9917 | 1.0000 |
|  | sum | 2.9378 | 3.0194 | 3.0448 |

Figure 24(c) CSP Comparison Matrices for SLA Content Areas

| | | Comparison Matrix for Content Area: Capability outside SLA CAs | | |
|---|---|---|---|---|
| | | CSP 1 | CSP 2 | CSP 3 |
| | CSP 1 | 1.0000 | 0.6066 | 0.9487 |
| CM = | CSP 2 | 1.6486 | 1.0000 | 1.5641 |
| | CSP 3 | 1.0541 | 0.6393 | 1.0000 |
| | sum | 3.7027 | 2.2459 | 3.5128 |

SYSTEM AND METHOD FOR ANALYZING CLOUD SERVICE PROVIDER TRUSTWORTHINESS AND FOR PREDICTING CLOUD SERVICE LEVEL AGREEMENT PERFORMANCE

CROSS REFERENCE TO RELATED APPLICATION

This application claims the benefit of U.S. Provisional Patent Application No. 62/832,985, filed on Apr. 12, 2019, which is hereby incorporated by reference for all purposes as if fully set forth herein.

BACKGROUND OF THE INVENTION

Field of the Invention

Exemplary embodiments of the present invention relate to a system and method for calculating cloud service provider (CSP) trustworthiness levels based on quantitative and qualitative analysis and measurements of CSP capabilities, and historical CSP cloud service level agreement (SLA) and cloud computing service performance, and for analyzing and applying the measurements and CSP trustworthiness level against cloud industry SLA standards to predict cloud computing service performance and cloud SLA availability.

Background

A 2017 cloud survey from Skyhigh Networks and Cloud Security Alliance identified the following key drivers for moving applications to cloud infrastructure (i.e. Infrastructure-as-a-Service providing subscription based processors, storage, network, software): increased security of cloud platforms, scalability based on workload, preference for operating expense vs capital, and lower costs. Unfortunately, along with these drivers are key challenges. A 2017 cloud survey from Rightscale identified challenges that included complexity and lack of expertise, security, ability to manage cloud spend, governance and ability to manage multiple cloud services. Clearly, there is overlap between the drivers and challenges, with lots of potential for financial risk and missed service level expectations.

Despite these potential risks and missed expectations, the cloud computing industry continues to grow. For example, Internet of Things, which is projected to grow 266% between 2013 and 2020, will drive increased demand and dependency on cloud computing as data across multiple industries is collected and sent back to cloud data centers for processing. RightScale estimates enterprises will continue to increase cloud demand and dependency with 85% in 2018 having multi-cloud strategies, up from 2016.

This growth and dependency will influence risk exposure and potential for impact (e.g. availability, reliability, performance, security, financial) Analytics firm Cyence estimated Amazon's four-hour cloud computing outage on Feb. 28, 2017 "cost S&P 500 companies at least $150 million" and traffic monitoring firm Apica claimed "54 of the top 100 online retailers saw site performance slump by at least 20 percent". As of January 2017, 95% of companies are dependent on Infrastructure-as-a-Service (IaaS) CSPs, and as cloud computing usage increases (400% 2013-2020), impact to service levels and financial risk from data center outages increase (81% 2010-2016). For example, according to Ponemon, the cost of data center outages in 2015 for Fortune 1000 companies was between $1.25 and $2.5 billion.

Of the data center outages between 2010 and 2016, 22% were caused by security. Furthermore, data breaches were up 40% in 2016. With the increased demand and dependency on cloud computing, risk to expected service levels (e.g. availability, reliability, performance, security), potential for financial impact, and level of trustworthiness of CSPs are all important areas requiring attention.

The overall goals of the invention are to utilize multiple methodologies to analyze and calculate CSP trustworthiness, and analyze, model and predict cloud SLA and cloud service performance, and validate the explanatory power and influence of multiple factors (e.g. cloud SLA standards and security controls, CSP trustworthiness, historical CSP SLA performance, cloud service performance and cloud characteristics) thereby managing risk and impact related to cloud services.

Considering the rate of adoption and dependency on cloud services, along with potential risk and impact (i.e. as above), there are important scenarios that organizations (e.g. cloud service customers, CSCs; cloud service providers, CSPs) are required to address. Unfortunately, there are a number of challenging technical problems associated with these scenarios. Current solutions have not taken a comprehensive approach toward these problems and their associated scenarios, for example:

All CSPs have proprietary and very minimal SLAs with no consistent system or technique for measuring, calculating and reporting actual service level compliance for cloud services. As a result, CSCs and CSPs have no common nor transparent system or method to predict (or even report on) the performance of cloud services or service level agreement (SLA) compliance. As such, it can be very difficult to set realistic and comprehensive contractual service levels for the provisioning, consumption and operation of cloud services. With the adoption of multi-cloud strategies by majority of CSCs, this becomes an even bigger problem when a CSC's cloud service dependency span CSPs.

There are a number of common structure and data elements for cloud service level agreements (SLAs) that need to be applied across multiple CSPs and accepted by CSCs. Predicting cloud service and SLA compliance is dependent on having a common cloud SLA structure, and defining and associating the appropriate measurements, data collection, and methods for calculations. These definitions and associations have multiple dimensions that need to be considered such as:

Performance (e.g. how did the CSPs cloud services perform last year, how often were CSP cloud SLAs in compliance, what is a CSP's track record).

Security (e.g. what security controls are required by the CSP or CSC, is the CSP in compliance with various security related regulations that can be location and industry dependent).

Configuration characteristics (e.g. how distributed and global are the CSP cloud services, where are they located, is there redundancy).

CSP reputation and integrity (e.g. can you trust the CSP . . . do they deliver on what they say, do they meet their commitments, do they have the required capabilities to meet expectations).

CSC expectations (are the CSCs requirements realistic and obtainable for the CSP).

When considering financial requirements, we need to understand what level of investment in cloud services is required by CSPs to support CSC's future service level expectations with respect to quality of cloud services. CSP's need to forecast competitive cloud service pricing and understand required future technology developments and associated costs. This requires the ability to consistently map CSC expectations, cloud SLAs, cloud services, performance, associated CSP capabilities and technologies to cloud service performance predictions and cloud SLA compliance predictions.

To best meet CSC cloud service requirements, we need to ask whether the CSC can better meet their cloud SLA requirements with private cloud services vs public cloud services. How are cloud services compared and contrasted, not just historical performance but future cloud service performance and future cloud SLA compliance?

Other approaches have been researched and developed to define SLAs, measure cloud service performance (albeit historical versus predictive), calculate whether SLA compliance was being met (again historical), and identify methods for assessing and comparing CSPs. However, these CSP assessment and comparison methods have specifically focused on the security capabilities of a CSP based on $3^{rd}$ party audits and reporting. Examples of some of the other approaches include: 1. IT Service Management Forum Information Technology Infrastructure Library (focused more as a framework based on service management with SLAs and best practice processes) [10]; 2. Cloud computing trust models (focused on cloud security controls with CSP evaluations and assessments, or focused on historical cloud service performance in terms of monitoring IT resources and technology based quality of service metrics such as utilization levels or response time) [8], [9].

The following are herein incorporated by reference: [1] Chatterjee, Samprit, and Ali S. Hadi. *Regression Analysis by Example.* Somerset: Wiley, 2013. [2] CSA CAIQ (2017). "Consensus Assessments Working Group." Cloud Security Alliance. Accessed Jul. 2, 2017, https://cloudsecurityalliance.org/group/consensus-assessments/#_overview. [3] CSA CCM (2017). "Cloud Controls Matrix Working Group." Cloud Security Alliance. Accessed Jul. 2, 2017. https://cloudsecurityalliance.org/group/cloud-controls-matrix/. [4] Hogben. Giles, and Mamix Dekker. "Procure Secure: A Guide to Monitoring of Security Service Levels in Cloud Contracts." Enisa.europa.eu. Apr. 2, 2012. https://www.enisa.europa.eu/publications/procure-secure-a-guide-to-monitoring-of-security-service-levels-in-cloud-contracts/at_download/fullReport. [5] ISO/IEC (2016). "Information Technology. Cloud Computing. Service Level Agreement (SLA) Framework." doi:10.3403/bsisoiec19086. [6] Saaty, Thomas L. *Decision Making for Leaders the Analytic Hierarchy Process for Decisions in a Complex World.* Pittsburgh, Pa.: RWS Publ., 2012. [7] EC (2014). "Cloud Service Level Agreement Standardisation Guidelines." Ec.europa.eu. Jun. 24, 2014. http://ec.europa.eu/newsroom/dae/document.cfm?action=display&doc_id=6138. [8] Almanea. Mohammed Ibrahim M. "Cloud Advisor—A Framework towards Assessing the Trustworthiness and Transparency of Cloud Providers." 2014 IEEE/ACM 7th International Conference on Utility and Cloud Computing, 2014. doi:10.1109/ucc.2014.168. [9] Emeakaroha, Vincent C., Ivona Brandic, Michael Maurer, and Schahram Dustdar. "Low Level Metrics to High Level SLAs-LoM2HiS Framework: Bridging the Gap between Monitored Metrics and SLA Parameters in Cloud Environments." 2010 *International Conference on High Performance Computing & Simulation,* 2010. doi: 10.1109/hpcs.2010.5547150. [10] Hunnebeck, Lou, Colin Rudd, Shirley Lacy, and Ashley Hanna. *ITIL Service Design.* London: TSO, 2011.

SUMMARY OF THE INVENTION

As previously mentioned, the primary deficiency in these previous attempts at addressing the aforementioned scenarios and problems is that they have not considered multiple aspects of the cloud service and cloud SLA lifecycle. These aspects should consider CSP capabilities and performance, as well as analyzing historical state and predicting future state for both cloud services and cloud SLAs, all of which are key elements and benefits. More specifically, the current disclosure provides for the following aspects that are deficiencies with other approaches.

Cloud SLA definition based on a set of multiple criteria related to 1. multiple CSC expectations (i.e. more than just cloud service downtime), and 2. driving a complete assessment of the CSP (e.g. trustworthiness based on more than just security).

Performance (predictive versus historical) of the cloud service and cloud SLA compliance and their relationship with the CSP's performance and capabilities. To predict future cloud service performance and the ability to meet future cloud SLA compliance, a holistic and multi-dimensional approach needs to be considered (e.g. CSP trustworthiness in addition to various cloud service and cloud SLA performance metrics).

Exemplary embodiments of the present invention provide a system to model and evaluate a CSP with respect to a broad set of criteria, including cloud computing service level agreements (SLAs) between the (cloud service customer) CSC and CSP, CSP cloud capabilities including cloud services and cloud security, and CSP compliance against industry cloud SLAs standards (e.g. from standards bodies such as ISO/IEC, EC, ENISA) and cloud security standards (e.g. CSA CCM, CAIQ). CSP trustworthiness is calculated and analyzed based on the modeling and evaluation of CSP cloud SLA content, CSP capabilities, CSP cloud service performance and cloud SLA performance. Techniques and methods applying Graph theory and multi-criteria decision analysis (MCDA) analytic hierarchy process (AHP) are used to analyze CSPs and cloud services, and model and calculate trustworthiness. As a result of the described cloud computing challenges, risks and impacts, CSCs may be unable to trust CSPs. Trust needs to be based on more than CSP claims. With security being one of the most important factors that can influence trust between the CSPs and CSCs, the Cloud Security Alliance (CSA) designed the Cloud Controls Matrix (CCM) and Consensus Assessments Initiative Questionnaire (CAIQ) to assist CSCs when assessing overall security capabilities of the CSP. While security remains a priority and rightly so, measuring and establishing CSP trustworthiness considers criteria based on a comprehensive quantitative and qualitative assessment of all CSP capabilities, CSC service level requirements, and CSP cloud service and CSP cloud SLA historical performance.

Exemplary embodiments of the present invention also provide a machine learning regression-based model to predict cloud service and SLA performance (e.g. availability) utilizing the modeling and calculations of CSP trustworthiness, cloud service capabilities, cloud service performance and cloud SLA performance. The predictive framework empowered by calculating and analyzing CSP trustworthiness, then predicting cloud service performance and cloud SLA availability compliance enables analysis of the following cloud service customer (CSC) requirements and questions: Did the CSP deliver the quality of service (QoS) they said they would deliver? Did the CSP meet CSC expectations? How comprehensive and transparent are the CSP's delivery and security capabilities (e.g. what is their level of Cloud Security Alliance (CSA) Cloud Controls Matrix (CCM) compliance)? With respect to future performance, does the CSP have the required capabilities to meet future CSC's service level requirements as represented by cloud SLAs?

Additional features of the invention will be set forth in the description which follows, and in part will be apparent from the description, or may be learned by practice of the invention.

An exemplary embodiment of the present invention provide that the effective management of cloud computing services, service level (e.g. availability) compliance and financial risk is dependent on the CSP's capabilities, CSP cloud SLA content, historical CSP performance (i.e. cloud services, cloud SLA). CSP trustworthiness and a predictive model for cloud service performance and service level compliance. Below are five high level scenarios depicting how this solution could be applied. Organizations can utilize the solution to:

Predict and set expectations concerning quality of cloud computing services.

Identify required levels of investment to support the required quality of cloud computing service.

Identify improvement programs to enhance cloud service capabilities and SLA and regulatory compliance.

Identify opportunities to right size cloud service capabilities based on financial drivers, competitive market conditions, customer requirements.

Evaluate and select CSPs or compare and contrast private vs public cloud computing services.

Related to the scenarios above, organizations (i.e. CSCs or CSPs) can specify the required cloud service performance and cloud service level prediction intervals to drive required values of corresponding predictor variables which ultimately ensure predictions remain within the expected prediction interval. This enables a reconciliation of the required capabilities and security in support of the required prediction interval. The required predictor variable values can provide visibility and awareness to the required cloud service capabilities and budgets (i.e. traceability and transparency from expectations to the required investment levels and cloud service capabilities that satisfy requirements). The predictive model can apply to both public cloud and/or private cloud scenarios (e.g. organizations that are comparing whether to utilize private vs public vs hybrid: or organizations that are assessing the required investment to their internal private cloud based on required cloud SLA availability levels).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 1(a), 1(b) show Architecture for CSP Trustworthiness and Cloud SLA Performance;

FIG. 2 is an AHP based CSP Trustworthiness framework:

FIG. 3 shows an AHP Hierarchy Structure;

FIG. 4 shows Relationships between Cloud SLA Standards and Organizations;

FIG. 5 shows Relationships between CSP SLAs and Cloud SLA Standards;

FIG. 6 is a Simple Regression Model Summary:

FIG. 7 is an ANOVA of Simple Regression Model;

FIG. 8 is a Multiple Regression Model Summary;

FIG. 9 is an ANOVA of Multiple Regression Model;

FIG. 12 is a Linear Regression Model Measurements (simple and multiple);

FIG. 13 is an ANOVA of Simple and Multiple Regression Models:

FIGS. 14(a), 14(b), 14(c), 14(d) show Industry Cloud SLA Standards;

FIGS. 15(a), 15(b), 15(c), 15(d), 15(e), 15(f) show CSA CCM and CSP Compliance;

FIGS. 16(a), 16(b), 16(c), 16(d), 16(e) show Cloud SLA Standard Content Areas to CCM and CAIQ;

FIG. 17 shows CSP Compute Service Availability;

FIG. 18 shows CSP Compute Service Region Availability:

FIG. 19 shows SLA Content Area capability ratios per CCM and CAIQ;

FIG. 20 shows CSP capability ratios per SLA Content Area;

FIG. 21 is a Comparison Matrix for SLA Content Area capability criteria:

FIG. 22 shows Priority Vector for SLA Content Area capability criteria;

FIGS. 23(a), 23(b), 23(c) show CSP Priority Vectors for SLA Content Areas; and

FIGS. 24(a), 24(b), 24(c) are CSP Comparison Matrices for SLA Content Areas.

DETAILED DESCRIPTION OF THE ILLUSTRATED EMBODIMENTS

Figure 10:
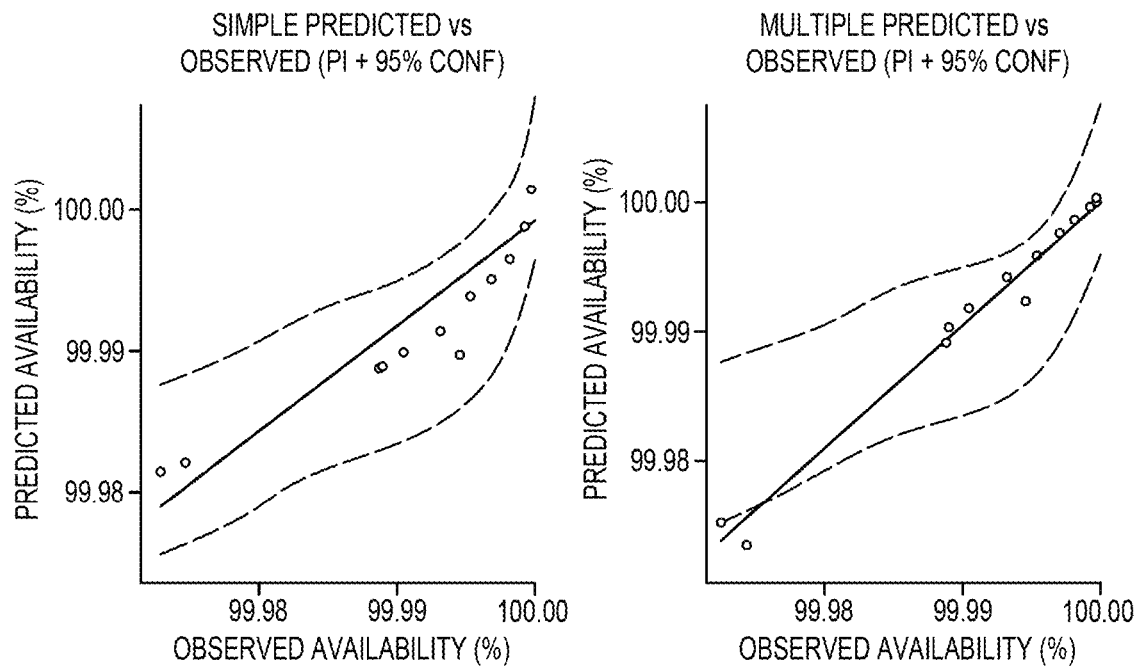
FIG. 10 shows Predicted availability % vs observed, with PI and 95% CI (Simple, Multiple)

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The architecture of the disclosure is presented by FIG. 1(a) and FIG. 1(b). FIG. 1(a) provides a physical view of the architecture, including computer systems, virtual machines, public clouds, software, databases, storage, network and external sources of integrations. FIG. 1(b) provides a logical, functional view with dynamic and real-time data flows between the different elements of the invention that were introduced by FIG. 1(a). As represented in FIG. 1(a), the architecture has three domains: modules, databases and integrations. These domains include: 1. three modules (Modeling Module 18, Trustworthiness Module 26, and a predictive module such as Regression Analysis Module 34), 2. corresponding databases for each of the modules (a modeling database 24 for the Modeling Module 18, a trustworthiness database 32 for the Trustworthiness Module 26, and a regression analysis database 40 for the Regression Analysis Module 34), and 3. integrations with data flows between the three modules and external data sources (10 ENISA, EC, ISO/IEC, 12 $3^{rd}$ Party CSP Monitoring Services, 14 Cloud Service Providers, 16 Cloud Security Alliance). Each module can be a processing device, deployed on either a virtual machine or packaged within a respective container as denoted by the modeling container 22, trustworthiness container 30 and regression analysis container 38. The runtime environment for the virtual machines and containers is comprised of 42 compute and storage that resides on either physical servers with local or network attached storage, or within a public cloud with provisioned virtual machines and storage.

Within each of the modules 18, 26, 34 resides three components that are aligned between FIG. 1(a) and FIG. 1(b): 1. Component I FIG. 1(a) 100 maps to FIG. 1(b) 100, 2. Component II FIG. 1(a) 102 maps to FIG. 1(b) 102, and 3. Component III FIG. 1(a) 104 maps to FIG. 1(b) 104). The components, as reviewed in detail by FIG. 1(b) and the following sections, represent the functionality and data flow of the modules. Component I 100, which focuses on modeling the Cloud SLA and Cloud Security Controls via Graph Theory Analysis (per FIG. 1(b) 116), leverages 112 data from multiple integrations and sources: 10 (ENISA, EC, ISO/IEC) for 112 SLA Standards, 14 (CSPs) for 112 CSP SLAs, and 16 (CSA) for 112 CCM and CSP CAIQs). Component II 102, which focuses on the application of MCDA AHP to calculate, analyze and rank CSPs via CSP trustworthiness levels (per FIG. 1(b) 120), leverages data from multiple integrations and sources: 12 ($3^{rd}$ Party CSP Monitoring Services) for 110 CSP cloud SLA Performance, 14 (CSPs) for 110 CSP cloud SLA Performance and CSP cloud service characteristics (e.g. #of global service regions and locations), and 18 (Modeling Module) for 118 Cloud SLA and Cloud Security Controls (for CSPs and Industry organizations). Component III 104, which focuses on the application of machine learning (regression analysis) for predicting CSP cloud service performance and CSP cloud SLA compliance (per FIG. 1(b) 124, 128, 106, 108, 114), leverages data from multiple integrations and sources: 12 ($3^{rd}$ Party CSP Monitoring Services) for 126 CSP Cloud Service and Performance, 14 (CSPs) for 126 CSP Cloud Service and Performance, and 26 (Trustworthiness Module) for 122 CSP Trustworthiness Level.

As depicted in FIG. 1(b), the functional flow of the invention utilizes systems and methodologies that include Graph Theory (Component I 100), MCDA AHP (Component II 102) and Regression Analysis (Component III 104). The operations of FIG. 1(b) are implemented by the architecture of FIG. (a), which can be performed by any suitable processing device, such as a server, computer, processor, mainframe, virtual machine, public cloud, or the like in combination with a database or other memory or storage device. The processing device can operate software stored at the storage device. Information can be transmitted or received directly or over a public networking system, such as the Internet, or over a private network.

The composite outcomes and models from the methodologies serve to support hypothesis testing and analysis 106 regarding which regression features and model(s) provide the greatest accuracy when predicting cloud SLA and cloud service performance 114. To validate the models, multiple Goodness of Fit measures 108 are evaluated in addition to assessing the value of the models at addressing the hypothesis. The information used by the models is based on CSP historical cloud service and performance data 110 from CSPs (e.g. Amazon, Google, Microsoft), in addition to the CSP SLA and CAIQ [2] self-assessments 112 concerning security capabilities from the CSA Security, Trust and Assurance Registry (STAR) [4].

Starting at the top of FIG. 1(b), Component I box 100 begins with multiple cloud related industry standards organizations (e.g. ISO/IEC, EC, ENISA, CSA) and CSPs 112 providing cloud-standards and cloud service provider data for Graph Theory analysis 116. Graph Theory analysis is leveraged to model data, analyze and compare the cloud organizations, cloud SLAs and cloud security controls. The cloud SLA 112 standards are developed by industry standards organizations EC. ENISA and IEC/ISO [7], [4], [5], and CSPs. The cloud 112 security controls or CCM 131, are defined by CSA, with CAIQ compliance results completed by each CSP. The CAIQ results for all CSPs are stored in the CSA's STAR. Model cloud SLA and security control output 118 for CSPs and industry standards from Graph Theory Component I defines required data models, and requirements related to CSPs, industry cloud SLAs and cloud security controls, and serves as input to Component II 102 noted on FIG. 1(b).

Component II box 102 as depicted on FIG. 1(b), utilizes Multi-Criteria Decision Analysis (MCDA) Analytic Hierarchy Process (AHP) techniques 120 to further analyze, calculate and rank each CSP in terms of trustworthiness levels. CSP trustworthiness level calculations 120 are based on the CSP's SLA and security capabilities contrasted against industry standard cloud SLAs and cloud security controls modeled 118 by Component I 100. CSP historical performance data 110 (e.g. actual CSP data, or data from Gartner's CSP monitoring service which includes cloud service availability and number of service regions per FIGS. 22, 23) is also fed into the AHP analysis and trustworthiness level calculations 120. The AHP analysis and calculations produce a CSP ranking that is utilized to calculate overall CSP trustworthiness levels 122 as input to Component III 104 on FIG. 1(b), Regression Analysis.

Component III box 104 depicted on the bottom of FIG. 1(b) utilizes Regression Analysis 124 to examine the relationships between multiple CSP cloud service variables, their related observations and CSP trustworthiness levels. CSP cloud service and performance variables 126 encompass CSP SLA availability, cloud service downtime, cloud service performance (e.g. latency, throughout), and characteristics regarding global cloud service hosting centers. CSP trustworthiness levels 122 are calculated from Component II 102. The result of the analysis of the relationships and machine learning 124 produced 128 regression models (e.g. simple, multiple) and predictions regarding cloud SLA and cloud service performance 114. Hypothesis are tested 106 regarding model performance, predictions and which regression features provided the greatest accuracy. Models and predictions were also validated by assessing multiple Goodness of Fit measures 108.

An in-depth review follows of Component I 100 in FIG. 1(*b*), which applies 116 Graph Theory analysis to model CSPs, industry standards organizations, cloud SLAs, and cloud security controls 118. A graph is an efficient way to describe a network structure and represent information about relationships 112 between nodes (e.g. visualize and analyze gaps and overlaps between industry and CSP organizations, and data structures related to cloud SLAs and cloud security controls). Graph Theory analysis 116 was used for this invention to model cloud SLA structure driven by industry standards organizations (EC, ENISA, ISO/IEC), its relationship with cloud SLAs provided by CSPs, and its relationship with cloud security controls from CSA. The primary goal was to define, model and analyze the data structure 118 that would be input to 102 Component II for calculating CSP trustworthiness. The CSA CCM 112 represents 16 governing and operating domains separated into control domains and across the domains, 133 controls and 296 control related questions. The CAIQ 112 provides a survey for CSPs to assess and communicate their capabilities across all domains. The CSP CAIQ survey results are maintained in the CSA STAR. Standards bodies such as EC, ENISA and ISO/IEC are working on SLA standards for the cloud industry 112. The SLA standards for EC, ENISA and ISO/IEC represent a combined set of 12 content areas and 82 components.

To drive the Graph Theory analysis 116 in FIG. 1(*b*) and the data structures 118 that flow to Component II102, Table 1 topics are analyzed to drive the data collection and network modeling via graphs.

TABLE 1

Data and relationship topics to analyze and model graphs

Cloud SLA standards (i.e. content areas) and their relation to industry standards organizations and target CSPs (see FIG. 4 & FIG. 5 for example graph models)?
Cloud SLAs for each target CSP (see FIG. 4 & FIG. 5 for example graph models)?
Relationship of cloud SLAs for each target CSP, including gaps and strength of any overlaps (see FIG. 5 for example graph models)?
Relationship of cloud SLAs for each target CSP with industry standards organizations (ISO/IEC, EC, ENISA) and industry cloud SLA standards (i.e. content areas) (see FIG. 4 & FIG. 5 for example graph models)?
Relationship between CSA CCM control domains and cloud SLA standards (i.e. content areas), including gaps and strength of any overlaps?
Relationship between CSA CCA and CAIQ for each target CSP?
Strength of CSA CCM capabilities across each control domain for each target CSP?

Each graph is assessed based on the following Graph Theory centrality factors:

Degree centrality—relevance of SLA content area or security control domain to an organizations.
Betweenness centrality—quantifies SLA content area or security control domain strength over an organization.

As an example with FIG. 4 and related Table 1 topics, the graph construction and centrality factor analysis in FIG. 4 models the work associated with cloud SLA standards from standards bodies 402 (triangle node, e.g. ISO/IEC, ENISA, EC) in addition to how the work relates with SLAs from CSPs 400 (circle node with three example CSPs: 1, 2, 3). In FIG. 4 standardized cloud SLA content has been organized into 12 content areas (square nodes) based on the SLA framework developed by ISO/IEC. The square nodes are: 1. Accessibility. 2. Attestations. Certifications and Audits. 3. Availability, 4. Change Management, 5. Cloud Service Performance, 6. Cloud Service Support, 7. Data Management, 8. Governance, 9. Information Security, 10. Protection of PII, 11. Service Reliability, 12. Termination of Service.

For each content area, the node size is based on the number of SLA details (i.e. components) specific to that content area in proportion to the combined total number of SLA details (i.e. components) for all content areas. The size of the node for each standards body is based on the number of relationships across all SLA content areas in proportion to the total number of available SLA content areas. The thickness (strength) of the relationship (tie) between a standards body (e.g. EC, ENISA, ISO/IEC) and a specific content area, denotes the quantity of SLA details (i.e. components) the standards body contributed to the content area in proportion to the total number of SLA details that exist for that content area. Related to the FIG. 4 example, the following observations are made as a result of the invention's Graph Theory analysis for the modeled nodes, ties and relationships, and centrality factor analysis.

1 of 12 SLA content areas had relationship with 3 of 3 CSPs (CSP 1, CSP 2, CSP 3): Availability.
3 of 12 SLA content areas received most contributions (each >20% of total components vs others<=10%): Info Security, Protection of PI, Data Management.
ISO/IEC contributed 12 of 12 SLA content areas; Primary for 9 of 12 (each contribution>=50% of content areas' components): Accessibility; Attestations, Certifications and Audits; Change Management: Data Management; Governance; Info Security; Protection of PII: Service Reliability: Termination of Service.
ENISA contributed 7 of 12 SLA content areas; Primary for 2 of 12 (each contribution>=50% of the content areas' components): Change Management, Governance.
EC contributed 7 of 12 SLA content areas; Primary for 1 of 12 (contribution>=500% of the content areas' components): Termination of Service.

An in-depth review follows of Component II 102 in FIG. 1(*b*), which applies 120 MCDA AHP techniques to model, analyze and calculate CSP trustworthiness levels 122. CSCs want to confirm claims from CSPs regarding the quality and security of their cloud services. Calculating and ranking the trustworthiness of CSPs provides a means for CSCs to rank CSPs and validate their ability to meet service level expectations. AHP is used to model and assess CSP trustworthiness 120 based on industry and CSP SLA and security related capabilities 118, and CSP historical SLA and cloud service performance 110. AHP provides an effective methodology for addressing MCDA problems that involve the assessment of multiple quantitative and qualitative criteria with pairwise comparisons organized into a hierarchical structure with weighting and aggregation of scores and ranking resulting from the comparisons. The AHP modeling and CSP trustworthiness level calculations 120 are based on industry and CSP cloud SLA capabilities and cloud security controls 118, historical CSP cloud SLA and cloud service performance 110 (e.g. availability, latency and throughput; utilization for CPU, storage, memory and network; provisioning time) and number and location of global cloud service hosting centers.

FIG. 2 presents the AHP steps referenced by 120 in FIG. 1(*b*) to calculate, analyze and rank CSP trustworthiness levels. As depicted in FIG. 2, with AHP, CSP and cloud service criteria (e.g. cloud SLA content, cloud security controls and CAIQ, cloud service performance) are quantified, weighted and compared for each CSP 200, 202, 204. The results of the comparisons are aggregated and CSPs are ranked 206. CSP trustworthiness is calculated based on the ranking 208.

In FIG. 2, the cloud SLA structure (i.e. Content Areas) is defined, step 200, based on related work from multiple industry standards organizations (i.e. ISO/IEC, EC, ENISA, CSA). FIGS. 14(a)-14(d) provide the consolidated SLA structure from the industry organizations. The figure is organized according to column one "Content Areas" 1400 (e.g. "Attestations, Certifications and Audits") with column three 1402 providing the "Description" for the Content Areas (e.g. "Attestations, certifications and audits represent the objectives related to methods CSPs may use to demonstrate compliance"). The amount of contribution from each industry standards organization 1404 (i.e. ISO/IEC, EC, ENISA) is represented by numeric values in columns 4, 5, 6. The values map to column 2, where the source of contribution from each organization's cloud SLA standard is referenced 1406 (e.g. cloud SLA "Component" from ISO/IEC/cloud SLA "Requirements" from EC/cloud SLA "Parameter Group" from ENISA). The "/" serves as a delimiter in 1406 column 2 to denote the separate contributions from each organization. As an example 1400, for "Content Area"="Attestations. Certifications and Audits", 1404 ISO/IEC with a value=1 is the only standards organization with contribution from their cloud SLA standard 1406 "Component"="Accessibility". As part of step 200, the CSA CCM framework is then mapped to the cloud SLA structure to enable construction of the AHP Hierarchy. FIGS. 16(a)-16(e) provide a demonstration of the mapping along with CAIQ based compliance for example CSPs which is applied in step 202A. Similar to FIG. 14, FIGS. 16(a)-16(e) are organized according to column one "Cloud SLA Standard Content Areas (CA)" 1600 (e.g. "Attestations, Certifications and Audits") with column two 1602 providing the "Content Area Description" for the Cloud SLA Standard Content Areas (e.g. "Attestations, certifications and audits represent the objectives related to methods CSPs may use to demonstrate compliance"). Column 3 1604 reflects which CSA CCM Control Domains (e.g. "Audit Assurance & Compliance") map to the Cloud SLA Standard Content Areas 1600 in column 1. Column 5 and sub-columns 1606 reflect the amount (number of CAIQs met and percentage) of CSP compliance to each CSA CCM Control Domain 1604 and subsequently to each Cloud SLA Standard Content Area 1600. This is referenced as part of step 202A "Map CSP CAIQ evaluation to SLA." As an example, 1606 shows CSP 1 in compliance with 13 of 13 CAIQs (1.0000 indicates 100%) for 1604 CSA CCM Control Domain "Audit Assurance & Compliance", subsequently representing 100% support for the Cloud SLA Standard Content Area 1600 "Attestations, Certifications and Audits." The Graph Theory analysis of cloud SLA specifications and the CCM framework established the structure and mapping that is used for the AHP hierarchy, step 200. FIG. 3 represents the AHP hierarchy structure with the following levels. The AHP structure drives the overall AHP calculations, pairwise comparisons, eigenvectors, weighting, priority vectors, and ultimately aggregation of priority vectors to rank CSPs and calculate trustworthiness levels.

- Level 1—Objective 300: Establish CSP trustworthiness based on the overall AHP-based CSP ranking.
- Level 2—SLA Content Areas 302: Identify the high-level criteria, i.e. Content Areas (e.g. Accessibility), of the SLA structure. The Content Areas represent the hierarchies of SLA elements and attributes.
- Level 3—SLA Elements and Attributes (Control Domains, Controls, CAIQs) 304: Define the CSA CCM Control Domains (e.g. Application & Interface Security) and related hierarchy of Controls and CAIQs (e.g. AIS-01.x-04.x) within a Content Area.
- Level 4—CSPs 306: Identify the CSPs whose capabilities are being assessed, compared and ranked with respect to trustworthiness.

Returning to FIG. 2, at step 202 the system then focuses on mapping CSP criteria (202A CSP CAIQ compliance, 202B CSP cloud service performance) to the cloud SLA structure defined in Step 200. As previously reviewed. FIG. 16 provides completed CSP CAIQ evaluations scores (example FIG. 16 1606), per step 202A, for CSA CCM control domains (example 1604) mapped to cloud SLA structure content areas (example 1600) from the defined cloud structure 200 and FIG. 14 (example 1400). The CSP CAIQ evaluations are scored (quantified and normalized) based on the degree of CCM compliance for the CSP (i.e. number of CAIQ questions the CSP answered with a yes: FIG. 16 example 1606). FIGS. 15(a)-15(f) provide a detailed view of CSP compliance (example 1502) for each CSA CCM Control Domain (example 1500) and associated controls. FIG. 15 is organized by CSA CCM Control Domains (example 1500) and associated Controls (example 1504) that are audited under each Control Domain. As previously noted, the level of CSP compliance against each Control Domain and Control is summarized in the columns (example 1502) after the Controls. The level of compliance then serves as input into FIG. 16 (example 1606) for each CSA Control Domain (example 1604). Leveraging Graph Theory analysis, FIG. 16 is constructed (example 1600) with the mapping of Cloud SLA Content Areas from FIG. 14 (example 1400), to CCM Control Domains (example 1604) from FIG. 15 (example 1500) and CAIQ compliance (example 1606) (i.e. number and percentage of questions answered with yes) from FIG. 15 (example 1502) for each example CSP.

The resultant level of CAIQ compliance for each CSP from FIG. 15 (example 1502), which serves as input into FIG. 16 (example 1606) for each control domain which are then mapped to SLA Content Areas, ultimately serve as input for the CSP AHP Comparison Matrices, comparison step 204. The AHP hierarchy structure weighting 308 (FIG. 3) of the AHP criterion is based on the overall quantity of CCM coverage 304 (FIG. 3) for each SLA Content Area 302 (FIG. 3) (i.e. number of CAIQs, Controls and Control Domains as ratios of the totals associated with each SLA Content Area). FIG. 19 presents these SLA Content Area measurements and ratios which serve to calculate the AHP hierarchy structure weighting on FIG. 3 308 (i.e. capability ratios) for each cloud SLA Content Area.

For SLA Content Area Availability. CSP historical performance measurements are required. These measurements are available from either CSPs, third parties or independent monitoring. FIGS. 17 and 18 provides example measurements from Gartner's Technology Planner Cloud Module. FIG. 18 presents measurements for three example CSPs organized by CSP Service Region. FIG. 17 presents total availability for each example CSP. The example measurements span 2015 to 2017 and are normalized and weighted based on the number of service regions in operation during each measurement period. Similar to CCM compliance for each CSP (via CAIQ), the availability performance for each CSP is a proportion (based on measurements and number of service regions) associated with the SLA Content Area (i.e. AHP evaluation criterion) "Availability."

TABLE 2

Comparison Matrices and Priority Vector Terms

| Term | Definition |
|---|---|
| ca | SLA Content Area. |
| $C_i$ | CSP i Where i = a for CSP 1, i = g for CSP 2, i = m for CSP 3. |
| $W_{ca}$ | Weight factor for SLA Content Area criteria (ca). |
| $V_{i,ca}$ | Value of content area (ca) capability ratio score for CSP ($C_i$). |

TABLE 2-continued

Comparison Matrices and Priority Vector Terms

| Term | Definition |
|---|---|
| $R_{ij,ca}$ | Relative rank ratio for pairwise comparison $V_{i,ca}/V_{j,ca}$ for two CSPs ($C_i$ and $C_j$). |
| $C_i/C_j$ | Relative rank ($R_{ij,ca}$) of $C_i$ over $C_j$ regarding ca. |
| $PV_{ca}$ | Priority vector entry for SLA Content Area (ca). |
| $PVC_i$ | Priority vector for CSP ($C_i$). |
| $WPVC_i$ | Weighted priority vector for CSP ($C_i$). |
| $TL\ C_i$ | Trustworthiness level for CSP ($C_i$). |

Returning to FIG. 2, step 204 is focused on pairwise comparisons and building AHP comparison matrices. Two types of comparison matrices (using terms in Table 2) are constructed:

Comparison Matrix for SLA Content Area capability criteria: per step 204, this matrix represents pairwise comparisons of AHP evaluation criteria utilizing SLA Content Area capability ratios. FIG. 21 provides an example comparison matrix based on the SLA Content Area capability ratios represented by FIG. 19.

CSP Comparison Matrices for SLA Content Areas (one per SLA Content Area): perstep 204, these matrices represent pairwise comparisons utilizing CSP capability ratios for each SLA Content Area. FIG. 24 provides an example set of comparison matrices for each SLA Content Area and example CSPs. FIG. 20 provides the capability ratios of each SLA Content Area for example CSPs that are used to complete the FIG. 24 comparison matrices.

When performing the pairwise comparisons in each SLA Content Area comparison matrix, the relationship of CSP capability ratio scores between two CSPs is represented as: $V_{i,ca}/V_{j,ac}$ (for CSPs $C_i$ and $C_j$). The result of the pairwise comparison calculation is the relative rank ratio which indicated the performance of $C_i$ compared to $C_j$ for the specified SLA Content Area (ca). For each SLA Content Area, the comparison matrix (e.g. size 3×3 based on a pairwise comparisons of three example CSPs: CSP 1=$C_a$, CSP 2=$C_g$, CSP 3=$C_m$) is constructed as shown in equation 1:

$$CM_{ca} = \begin{array}{c} \\ C_a \\ C_g \\ C_m \end{array} \begin{array}{|ccc|} C_a & C_g & C_m \\ (C_a/C_a) & (C_a/C_g) & (C_a/C_m) \\ (C_g/C_a) & (C_g/C_g) & (C_g/C_m) \\ (C_m/C_a) & (C_m/C_g) & (C_m/C_m) \end{array} \quad (1)$$

Turning to step 4 206, the system next creates the normalized, reciprocal matrices and priority vectors (i.e. normalized principle Eigenvector) for the AHP evaluation criteria (i.e. SLA Content Area capability) and for the CSP capability per each SLA Content Area. Two types of priority vectors have been constructed.

Priority Vector for SLA Content Area capability (FIG. 22 provides a view of the priority vector): per step 206, the comparison matrix calculated in step 204, to calculate the priorities (weights), a pairwise comparison is performed among all SLA Content Areas using their capability ratios introduced in step 200. The priority vector (from FIG. 22) represents weights, also displayed in Table 3, for each SLA Content Area. These are used to calculate overall CSP priority vectors. When assessing SLA Content Area capability criteria, we need to identify their relative priorities since not all priorities are the same. The priority (weight) essentially reflects the importance/contribution/influence of a SLA Content Area with respect to the others.

TABLE 3

SLA Content Area Criteria Weight

| Weight | SLA Content Area | Criteria |
|---|---|---|
| 0.0655 | Acc | Accessibility |
| 0.0236 | ACA | Audits |
| 0.0982 | Avail | Availability |
| 0.0222 | Chg Man | Change Management |
| 0.0653 | CS Perf | Cloud Service Performance |
| 0.0264 | CS Supp | Cloud Service Support |
| 0.0348 | Data Man | Data Management |
| 0.0473 | Gov | Governance |
| 0.3198 | Info Sec | Information Security |
| 0.1029 | Pro PII | Protection of PII |
| 0.0487 | Svc Rel | Service Reliability |
| 0.0655 | Term Svc | Termination of Service |
| 0.0799 | Outside CA | Capability outside SLA CAs |

CSP Priority Vectors for each SLA Content Area (FIG. 23 provides a view of the priority vectors for each SLA Content Area and example CSPs): per step 206, the comparison matrices for each SLA Content Area calculated in step 204, to calculate the local CSP priorities, pairwise comparisons are performed using the CSP capability ratios of each SLA Content Area introduced in step 200. For each SLA Content Area, a comparison matrix and priority vector (from FIG. 23) is constructed to present the corresponding CSP pairwise comparisons and priorities. These are used as input to step 208 for performing CSP AHP based estimation to calculate the overall CSP priority vectors.

Utilizing Equation 2 (Normalized, reciprocal SLA Content Area Matrix and Priority Vector), the normalized, reciprocal matrices and priority vectors are built using the SLA Content Area Comparison Matrix from Equation 1. Columns are then summed and each element ($C_i/C_j$) is divided by the sum of its column ($R_{ij,ca}/\sum_{i=a,a,m}R_{ij,ca}$) to normalize the relative weight of each element.

$$\begin{array}{c} \\ \\ C_a \\ C_g \\ C_m \\ \text{sum} \end{array} \begin{array}{|ccc|c|} C_a & C_g & C_m & PV_{ca} = \\ (C_a/C_a)/\text{sum} & (C_a/C_g)/\text{sum} & (C_a/C_m)/\text{sum} & \sum(C_a/C_j)/3 \quad (j=a,g,m) \\ (C_g/C_a)/\text{sum} & (C_g/C_g)/\text{sum} & (C_g/C_m)/\text{sum} & \sum(C_g/C_j)/3 \quad (j=a,g,m) \\ (C_m/C_a)/\text{sum} & (C_m/C_g)/\text{sum} & (C_m/C_m)/\text{sum} & \sum(C_m/C_j)/3 \quad (j=a,g,m) \\ \sum C_i/C_a & \sum C_i/C_g & \sum C_i/C_m & \\ (i=a,g,m) & (i=a,g,m) & (i=a,g,m) & \end{array} \quad (2)$$

Once each matrix element is normalized, the priority vectors PV (i.e. normalized principle Eigenvectors) are created by averaging each row of the normalized, reciprocal matrix for each SLA Content Area ($\overline{\Sigma_{i=a,a,m}R_{i/j,ca}}/3$). The sum of all elements in the priority vector for each SLA Content Area is one. The priority vector (PV) in Equation 2 represents relative weights related to each CSP for each SLA Content Area. The priority vector represents numerical values that specify the CSP order of preference for the SLA Content Area (i.e. a representation of which CSP is more capable for each SLA Content Area).

Finally, step 208 of FIG. 2 calculates the AHP based estimation (i.e. relative trustworthiness level) by building the CSP priority vectors based on the step 206 SLA Content Area Priority Vectors (FIG. 23). The weighted factors in Table 3 calculated by step 206 are then applied to the CSP priority vectors to build the weighted CSP priority vectors. Finally, the Trustworthiness Level for each CSP is calculated by aggregating the weighted CSP Priority Vectors. The following steps are taken when building the CSP Priority Vectors, applying the weighting, and calculating CSP Trustworthiness Levels. The SLA Content Area priority vectors ($PV_{ca}$) introduced by Equation 2 are arranged by CSP to build CSP priority vectors as defined by Equation 3. Refer to Table 3 for ca abbreviations.

$$PV\ C_i = (PV_{ca} \ldots PV_{ca})$$

$$(i=a,g,m)$$

$$(ca=Acc, ACA, \text{Avail}, Chg\ Man, CS\ Perf, CS\ \text{Supp}, Data\ Man, Gov, \text{Info Sec}, Pro\ PII, Svc\ Rel, \text{Term Svc}, \text{Outside } CA) \quad (3)$$

For each CSP Priority Vector (PV $C_i$) per Equation 3, each SLA Content Area priority vector entry ($PV_{ca}$) is multiplied by corresponding SLA content area criteria weight in Table 3. The result is weighted AHP based estimation for each CSP as represented in Equation 4, i.e. weighted priority vectors for each CSP. Refer to Table 3 for ca abbreviations.

$$WPV_i = (PV_{ca} \times W_{ca} \ldots PV_{ca} - W_{ca})$$

$$(i=a,g,m)$$

$$(ca=Acc, ACA, \text{Avail}, Chg\ Man, CS\ Perf, CS\ \text{Supp}, Data\ Man, Gov, \text{Info Sec}, Pro\ PII, Svc\ Rel, \text{Term Svc}, \text{Outside } CA) \quad (4)$$

In Equation 4, the weight factor ($W_{ca}$) is multiplied by each SLA Content Area Priority Vector ($PV_{ca}$) entry. The calculation of the weight factors from Table 3, introduced in step 206, is based on the priority vector for SLA content area capability criteria. For each CSP (C where i=a,g,m), weighted priority vector entries ($PV_{ca} \times W_{ca}$) for all SLA Content Areas (ca) from Equation 4 and WPV $C_i$, are aggregated to represent the final CSP Trustworthiness Level represented by Equation 5.

$$TL\ C_i = \Sigma(PV_{ca} \times W_{ca}) \quad (5)$$

Once the CSP Priority Vectors and relative trustworthiness levels are constructed per step 208, the overall priority for each CSP (i.e. each alternative in the FIG. 3 AHP Hierarchy 306) is calculated. In the previous steps, the priorities were local and reflected the CSP priority with respect to each individual SLA Content Area (i.e. criterion). With the overall priority for each CSP, we take into account not only the CSP priorities for each criterion but also the weighting factor of each criterion (i.e. SLA Content Area). This ties all levels of the hierarchy together and represents "model synthesis" [6]. In this step, calculating CSP trustworthiness performs AHP based estimation by building CSP priority vectors (see Table 4 example) based on the CSP Priority Vectors for each SLA Content Area from step 206. The following depicts the example priority vectors for example CSPs.

TABLE 4

CSP Priority Vectors

|  | Acc | ACA | Avail | Chg Man | CS Perf | CS Supp | Data Man | Gov | Info Sec | Pro PII | Svc Rel | Term Svc | Outside CA |
|---|---|---|---|---|---|---|---|---|---|---|---|---|---|
| CSP 1 | ( 0.3404 | 0.3421 | 0.3334 | 0.3448 | 0.3626 | 0.3514 | 0.3636 | 0.3333 | 0.3525 | 0.3485 | 0.3387 | 0.3404 | 0.2701 ) |
| CSP 2 | ( 0.3312 | 0.3158 | 0.3334 | 0.3103 | 0.3077 | 0.2973 | 0.3182 | 0.3333 | 0.3104 | 0.3258 | 0.3226 | 0.3312 | 0.4453 ) |
| CSP 3 | ( 0.3284 | 0.3421 | 0.3332 | 0.3448 | 0.3297 | 0.3514 | 0.3182 | 0.3333 | 0.3370 | 0.3258 | 0.3387 | 0.3284 | 0.2847 ) |

The weight factors for each SLA Content Area Criteria are applied to the CSP priority vectors (i.e. each SLA Content Area weight factor from Table 3 is multiplied by each priority in the CSP priority vectors from FIG. 23) to build the example weighted CSP priority vectors in Table 5.

TABLE 5

CSP Weighted Priority Vectors

|  | Acc | ACA | Avail | Chg Man | CS Perf | CS Supp | Data Man | Gov | Info Sec | Pro PII | Svc Rel | Term Svc | Outside CA |
|---|---|---|---|---|---|---|---|---|---|---|---|---|---|
| CSP 1 | ( 0.0223 | 0.0081 | 0.0327 | 0.0077 | 0.0237 | 0.0093 | 0.0126 | 0.0158 | 0.1127 | 0.0359 | 0.0165 | 0.0223 | 0.0216 ) |
| CSP 2 | ( 0.0217 | 0.0075 | 0.0327 | 0.0069 | 0.0201 | 0.0079 | 0.0111 | 0.0158 | 0.0993 | 0.0335 | 0.0157 | 0.0217 | 0.0356 ) |
| CSP 3 | ( 0.0215 | 0.0081 | 0.0327 | 0.0077 | 0.0215 | 0.0093 | 0.0111 | 0.0158 | 0.1078 | 0.0335 | 0.0165 | 0.0215 | 0.0228 ) |

Finally, the comparative trustworthiness level for each CSP is calculated by aggregating the weighted CSP Priority Vectors. Table 6 is an example that shows the relative trustworthiness ranking of the example CSPs. The higher the CSP ranking, the higher the level of CSP trustworthiness. In the example, given the importance (weight) of each SLA Content Area (i.e. evaluation criteria), CSP 1 is the most trusted of the three CSPs.

ness level is calculated. The absolute trustworthiness level is a ratio (between 0 and 1) of the CSP's capability vs the maximum potential and is leveraged as a predictor variable for Regression Analysis. The example in Table 7 depicts CSP 1's absolute trustworthiness level of 92.13%. CSP 2 (88.6%) and CSP 3 (89.13%) are calculated in the same manner.

TABLE 7

Example Absolute CSP Trustworthiness Level

| Comparison Matrix for Content Area: Accessibility | | | Priority Vector (normalized principle Eigenvector): Accessibility | | | |
|---|---|---|---|---|---|---|
| | Maximum | Amazon | | Maximum | Amazon | PV |
| Maximum | 1.0000 | 1.1108 | Maximum | 0.5262 | 0.5262 | 0.5262 |
| Amazon | 0.9002 | 1.0000 | Amazon | 0.4738 | 0.4738 | 0.4738 |
| sum | 1.9002 | 2.1108 | sum | 1.000 | 1.000 | 1.000 |

CSP 1 Priority Vector

| | Acc | ACA | Avail | Chg Man | CS Perf | CS Supp | Data Man | Gov | Info Sec | Pro Pll | Svc Rel | Term Svc | Outside CA |
|---|---|---|---|---|---|---|---|---|---|---|---|---|---|
| Maximum | (0.5262 | 0.5000 | 0.5000 | 0.5000 | 0.5000 | 0.5000 | 0.5152 | 0.5000 | 0.5062 | 0.5158 | 0.5227 | 0.5262 | 0.6376) |
| CSP 1 | (0.4738 | 0.5000 | 0.5000 | 0.5000 | 0.5000 | 0.5000 | 0.4848 | 0.5000 | 0.4938 | 0.4842 | 0.4773 | 0.4738 | 0.3524) |

CSP 1 Weighted Priority Vector

| | Acc | ACA | Avail | Chg Man | CS Perf | CS Supp | Data Man | Gov | Info Sec | Pro Pll | Svc Rel | Term Svc | Outside CA |
|---|---|---|---|---|---|---|---|---|---|---|---|---|---|
| Maximum | (0.0344 | 0.0118 | 0.0491 | 0.0111 | 0.0327 | 0.0132 | 0.0179 | 0.0236 | 0.1619 | 0.0531 | 0.0254 | 0.0344 | 0.0518) |
| CSP 1 | (0.0310 | 0.0118 | 0.0491 | 0.0111 | 0.0327 | 0.0132 | 0.0169 | 0.0236 | 0.1579 | 0.0498 | 0.0232 | 0.0310 | 0.0282) |

CSP 1 Absolute Trustworthiness Level

| Maximum | 0.5205 |
|---|---|
| CSP 1 | 0.4795 |
| | 92.13% |

TABLE 6

| CSP Relative Trustworthiness Levels | |
|---|---|
| CSP 1 | 0.3411 |
| CSP 2 | 0.3293 |
| CSP 3 | 0.3296 |

The CSP relative trustworthiness levels in Table 6 are effective for comparing the relative capabilities of two or more CSP's. The ultimate objective is to provide Regression Analysis with an overall absolute (vs relative) trustworthiness level for each CSP. This requires comparison matrices and priority vectors for each content area based on a CSP's capabilities vs the maximum potential capabilities. Table 7 presents an example for CSP 1 and the Accessibility SLA Content Area. The same process is then implemented as outlined for Tables 4, 5, 6. For the CSP example, the resultant Priority Vector, Weighted Priority Vector (i.e. each SLA Content Area weight factor from Table 3 is multiplied by each priority in the CSP 1 priority vector) and Absolute Trustworthiness Level is presented. After aggregating CSP 1's Weighted Priority Vector, the absolute CSP trustworthi- An in-depth review follows of Component III 104 in FIG. 1(*b*), which applies 124 predictive analysis such as machine learning Regression analysis, to model and predict cloud SLA availability and cloud service performance 114. Regression analysis is used to investigate functional relationships between CSP and cloud service variables and ultimately develop models to predict cloud SLA and cloud service availability. The predictive modeling utilizes 122 CSP trustworthiness levels in addition to 126 historical CSP cloud SLA and cloud service performance and characteristics data (e.g. downtime; networking latency and throughput; global cloud service hosting centers, resource utilization; provisioning turnaround). Multiple regression models (e.g. simple, multiple) 128 are created to relate predictor variables with the response variable and drive predictions that enabled analysis and testing of the stated hypothesis. The following activities guide the regression analysis 104.

Define the problem statement (Hypothesis): e.g. SLA-based cloud service availability can be predicted with greater accuracy when calculated with multiple criteria (e.g. CSP trustworthiness: global cloud service locations, resource capacity and performance) versus single criteria such as historical cloud service downtime.

Select variables 126, 122 that explain the response variable: Response variable=Y (Cloud service Availability); Example predictor variables=$X_1, X_2, X_3, X_4, X_5$
  $X_1$=Cloud service downtime
  $X_2$=CSP trustworthiness level
  $X_3$=Global service region locations
  $X_4$=Number of cloud service regions
  $X_5$=Cloud service performance Identify and collect required cloud service and CSP data 122, 126: Target data sources for predictor variables include CSA, ISO/IEC, EC, ENISA, Gartner. CSPs (e.g. Amazon, Google, Microsoft).

Define linear regression model specification 124: The relationship between the response (Y) and predictor variables ($X_1, X_2, X_3, X_4, X_5$) can be approximated by the regression models of Y=f($X_1$)+E for simple regression and Y=f($X_1, X_2, X_3, X_4, X_5$)+E for multiple regression. "E is assumed to be a random error representing the discrepancy in the approximation" and accounts for the "failure of the model to fit the data exactly" [1].

Select the fitting method 124: Least squares regression is used for estimating parameters of the model(s).

Fit the model: Fit the model(s) 124 to the available cloud service and CSP observations to estimate the regression coefficients and produce the predictions 128.

Validate and critique the model(s): Analyze linear regression assumptions for models and related data, validate the Goodness of Fit measures 108, and test the hypothesis 106.

Utilize the model(s) and prediction(s) 114 for the identified problem and hypothesis.

An example simple linear regression model demonstrates the machine learning analysis and prediction 124 for Component III 104 in FIG. 1(*b*). The simple linear regression model 128 is denoted by the equation Y=$B_0$+$B_1$X+E where $B_0$ and $B_1$ represent the regression coefficients and E is the "random disturbance or error" [1]. $B_1$ is the slope (i.e. changes in cloud service and SLA Availability for a unit of change in cloud service Downtime), and $B_0$ is the constant coefficient (i.e. intercept, predicted value of Y when X=0). For the model, the goal is to estimate $B_0$ and $B_1$, and "find the straight line that provides the best fit" of the response versus predictor variable using least squares [1]. FIG. 6 depicts the example simple regression model summary 128 for FIG. 1(*b*), and FIG. 7 shows the related ANOVA results for the example model. Reviewing FIG. 6, we can confirm the simple regression formula, performance of the model when predicting cloud service and SLA availability, the statistical significance of the coefficients, and the R-squared performance. With FIG. 7 we can confirm the statistical significance of the regression model's coefficient and the sum of squares between the coefficient and residuals.

An example multiple linear regression model demonstrates the machine learning analysis and prediction 124 for Component III 104 in FIG. 1(*b*). The multiple linear regression model 128 is denoted by the equation Y=$B_0$+$B_1X_1$+$B_2X_2$+$B_3X_3$+$B_4X_4$+$B_5X_5$+E, where $B_0, B_1, B_2, B_3, B_4, B_5$ are the regression coefficients, and E is the "random disturbance or error" [1]. Each regression coefficient ($B_1, B_2, B_3, B_4, B_5$) represents the slope (i.e. changes in cloud service and SLA Availability for a unit of change in a coefficient as other coefficients are held constant), and $B_0$ is the constant coefficient (i.e. intercept, predicted value of Y when X=0). For the model, the goal was to estimate parameters $B_0, B_1, B_2, B_3, B_4, B_5$ and "find the straight line that provided the best fit" of the response versus predictor variables using least squares method [1]. FIG. 8 depicts the example multiple regression model summary 128 for FIG. 1(*b*), and FIG. 9 shows the related ANOVA results for the example model. Reviewing FIG. 8, we can confirm the multiple regression formula, performance of the model when predicting cloud service and SLA availability, the statistical significance of the coefficients, and the R-squared performance. With FIG. 9 we can confirm the statistical significance of the regression model's coefficients and the sum of squares between the coefficients and residuals.

The machine learning regression model processing 124 of FIG. 1(*b*) analyzes data outliers (related to variable data 122 and 126) and linear model assumptions, transforms predictor variable(s) as required, and performs iterative model fitting and analysis. The results of the processing are the final model(s) and prediction(s) 128 represented by FIG. 1(*b*). Processing in 124 FIG. 1(*b*) includes the following four steps. (1) A K-fold cross-validation method is applied to calculate measure of errors for polynomial fit with different degrees. (2) Cross-validation analysis is applied to improve the fit of simple linear regression models. (3) Multiple methods are applied to select a subset of predictor variables for multiple regression equations. The methods include stepwise selection (forward, backward, both using AIC), all-subset regression using leaps, and best subset selection. (4) Lastly and based on the final model summaries (examples FIG. 6 and FIG. 7 for simple regression model; FIG. 8 and FIG. 9 for multiple regression model) the following analysis is performed.

Is p-value for the overall model<0.05 (an overall test of the statistical significance for the model)?

Does the model have a strong R-squared, indicating majority of variance related to the response variable is explained by predictor variable(s) vs random error?

How large was the residual standard error, which measures the average amount the response variable "deviates from the true regression line for any given point" (i.e. how far observed Y values are from the predicted values) [1]?

Are the p-values for the regression coefficients statistically significant (i.e. <0.05)?

After analysis of the model's results, ANOVA (examples FIG. 7, FIG. 9) and linear regression assumptions were analyzed (Linearity, Normality, Independence, Homoscedasticity), driving any required variable transformation.

Example goodness of fit 108 (FIG. 1(*b*)) measurements to analyze and validate model performance for the aforementioned example simple and multiple linear regression models are provided in FIG. 12 and FIG. 13. To compare the models, predictions are performed with multiple prediction intervals between 50% and 95% using 5% increments. The total and average number of successful predictions that fell within the prediction intervals are analyzed. To visually compare the models, FIG. 10 depicts a plot of predicted versus observed cloud service availability for the two example models (simple, multiple) along with 95% prediction intervals (black dotted line) and 95% confidence intervals (grey shading). An additional plot is provided in FIG. 11 for visual comparison of predicted vs observed cloud service availability of the two models (simple, multiple). ANOVA is used to compare models and measure, as an example, what multiple regression adds to the prediction versus simple regression.

FIG. 13 depicts the example results from applying ANOVA on the models. With the conventional test, regression sums of squares is compared for the two models (i.e.

extra sum of squares test). The null hypothesis that additional predictors all have zero coefficients is tested using the F-statistics. The extra sum of squares is the "amount by which the residual sum of squares [was] reduced by the additional predictors. From the test, we have 1300 Sum of Squares=0.00059632, with a 1302 p-value=2.2E-16 (<0.05 so statistically significant). With this p-value, we can reject the null hypothesis that the models are the same. Since p-value is <0.05, the models differ, so the additional predictors in the multiple regression model do account for enough variance (and have explanatory and predictive power).

Once multiple final regression models and predictions 128 (FIG. 1(b)) are constructed and measured for fit, they are tested via a hypothesis 106 (FIG. (b)) concerning which model performs the best. With the two example models (simple, multiple), the hypothesis testing 106 focused on whether additional regression coefficients of a multiple linear regression model provides statistically significant contribution to explaining cloud service availability vs a simple linear regression model with a single coefficient . . . i.e. did the additional variables of the multiple linear regression model provide explanatory or predictive power to the model, thereby improving the performance of the multiple regression model over the simple regression model)? When assessing the two models (e.g. simple vs multiple), the following null and alternative hypothesis are tested.

$H_0$: Multiple Linear Regression model performance=Simple Linear Regression model performance. i.e. there was zero difference in accuracy between the two models ($B_j=0$): no additional variables add explanatory/predictive power to the Simple Linear Regression model.

$H_a$: At least one additional variable (B) has a statistically significant contribution to explaining/predicting Y (cloud service availability). Therefore ($B_j!=0$), and the variable should remain in the model.

Figure 11:
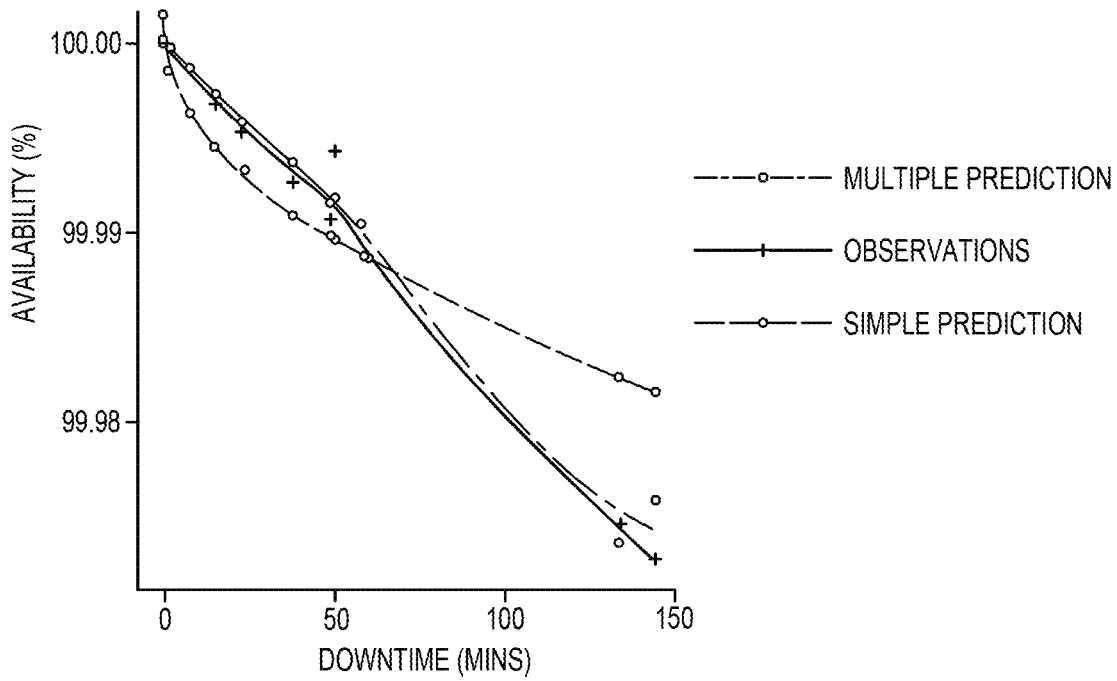
FIG. 11 shows Simple and Multiple Availability % (predicted vs observed)

The example null hypothesis proposes a simple linear regression model with a single regression coefficient for cloud service downtime has zero difference in accuracy vs a multiple linear regression model with multiple regression coefficients. In other words, the hypothesis asserts that no additional variables besides cloud service downtime offer explanatory or predictive power to the linear regression model. The alternative hypothesis states that at least one additional variable provides statistically significant contribution to explaining cloud service availability and therefore should be in the model. The decision to reject or fail to reject the null hypothesis is based on the Goodness of Fit measures 108 (FIG. 1(b), FIG. 12), including the ANOVA F-test results (FIG. 13) comparing the two models. For the example, the Goodness of Fit measures and ANOVA results reject the null hypothesis. The conclusion between the two models is that predicting cloud SLA and cloud service availability 114 (FIG. 1(b)) does have greater accuracy when calculated with more predictor variables than just historical cloud service downtime. FIG. 11 provides additional confirmation with visualization that the example multiple regression provides a better fit than the simple regression.

The operation of the architecture depicted on FIG. 1(a) and the temporal aspects of the data flow between the modules (Modeling Module 18, Trustworthiness Module 26, Regression Analysis Module 34) and across external integrations (ENISA, EC, ISO/IEC 10; $3^{rd}$ Party CSP Monitoring Services 12, CSPs 14, CSA 16) comprise multiple patterns (e.g. real-time and dynamic processing blended with batch mode and scheduled data queries and database updates). The temporal attributes and patterns are dependent on the type and source of data, rate of change, and components (100 Component I, 102 Component II, 104 Component III) involved in the processing of the data. ENISA, EC, ISO/IEC 10 data represents cloud SLA models from standards bodies.

These models are typically stable with minimal change, or at least any change tends to occur over long periods of time, so batch mode and scheduled data flows to the Modeling Module 18 are applicable. For integrations and data flow from $3^{rd}$ Party CSP Monitoring Services 12 and CSPs 14 to the Trustworthiness Module 26 and Regression Analysis Module 34, the data reflects a dynamic rate of change during 24×7 periods, so these integrations and data flows are in real-time, subsequently resulting in dynamic rebuilding of the trustworthiness levels from Component II 102 and recalculation of machine learning models and predictions for CSP cloud service performance and CSP cloud SLA compliance. The integrations and data flows from CSA 16 have temporal attributes and patterns similar to ENISA, EC. ISO/IEC 10.

The industry standard CCM cloud security framework and controls, and CAIQ CSP cloud controls security audits experience minimal change or at least any change tends to occur over long periods of time, so batch mode and scheduled data flows to the Modeling Module 18 are applicable. Between the modules (Modeling Module 18, Trustworthiness Module 26, Regression Analysis Module 34), the integrations and data flows can be dynamic and real-time since they are driven by the temporal attributes of the aforementioned external integrations and data flows, which ultimately trigger the component processing (Component I 100, Component II 102, Component III 104) in each of the modules.

Accordingly, the entire operation is conducted automatically by the processor, and without any manual interaction. Unless indicated otherwise, the process can occur substantially in real-time without any delay or manual action. In addition, the system operates dynamically: for example, the various modules continually receive data and information and continually determine the trustworthiness level.

More specifically, the modeling module operates in real time and dynamically to generate, by graph theory analysis, a cloud-standards and cloud service provider model based on the cloud-standards data and cloud service provider data, wherein the cloud-standards data and cloud service provider data include cloud service level agreement (SLA) data and associations to cloud security controls. And, the trustworthiness module operates dynamically and in real time to determine, by multi-criteria decision analysis analytic hierarchy process (MCDA AHP), a CSP trustworthiness level for each CSP based on a comparison of the cloud-standards and cloud service provider model, CSP cloud SLA performance data, CSP cloud service performance data, and CSP cloud service characteristics. And, the regression analysis module operates dynamically and in real time to generate, using machine learning regression analysis, a regression model based on the CSP trustworthiness level, CSP cloud SLA performance data, CSP cloud service performance data, and CSP cloud service characteristics, to provide a CSP cloud service performance prediction and a CSP cloud SLA compliance prediction.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system for analyzing and ranking cloud service providers (CSPs), comprising:
   a processing device having:
   a processor-executed modeling module generating, by graph theory analysis, a cloud-standards and cloud service provider model based on cloud-standards data and cloud service provider data, wherein the cloud-standards data and cloud service provider data include cloud service level agreement (SLA) data and associations to cloud security controls; and,
   a processor-executed trustworthiness module configured to determine, by multi-criteria decision analysis analytic hierarchy process (MCDA AHP), a CSP trustworthiness level for each CSP based on a comparison of the cloud-standards and cloud service provider model, CSP cloud SLA performance data, CSP cloud service performance data, and CSP cloud service characteristics;
   a processor-executed regression analysis module that generates, using machine learning regression analysis, a regression model based on the CSP trustworthiness level, the CSP cloud SLA performance data, the CSP cloud service performance data, and the CSP cloud service characteristics, to provide a CSP cloud service performance prediction and a CSP cloud SLA compliance prediction.

2. The system of claim 1, wherein the cloud security controls is a model of industry standard cloud security controls and their association with model cloud SLA, and the cloud security controls are used to assess the level compliance against the industry standard cloud security controls for the CSP.

3. The system of claim 1, wherein the CSP cloud service characteristics include number of CSP service regions and location of global data centers.

4. The system of claim 1, wherein said trustworthiness module ranks the CSPs based on CSP trustworthiness levels.

5. The system of claim 1, wherein said regression analysis module predicts performance of CSP cloud services to meet CSP cloud SLA availability targets.

6. The system of claim 1, further comprising an AHP hierarchy data model and structure for representing cloud SLAs, the cloud security controls, CSP trustworthiness levels, and CSP cloud service performance and CSP cloud SLA compliance evaluated against the data model and structure.

7. The system of claim 6, said structure comprising associations, qualitative measurements, quantitative measurements for CSPs and cloud industry standards organizations.

8. The system of claim 7, wherein said cloud industry standards organizations include International Organization for Standardization/International Electrotechnical Commission (ISO/IEC), European Commission (EC), European Union Agency for Cybersecurity (ENISA), Cloud Security Alliance (CSA).

9. The system of claim 7, wherein measurements include analysis of capabilities, compliance and performance related to CSP cloud services, CSP cloud SLAs standards, cloud security frameworks, controls, and IT service management capabilities.

10. The system of claim 9, wherein the cloud security frameworks include CSA CCM (Cloud Security Alliance Cloud Controls Matrix), CSA CAIQ (Cloud Security Alliance Consensus Assessments Initiative Questionnaire) and IT service management include ITSMF (IT Service Management Forum) ITIL (Information Technology Infrastructure Library).

11. The system of claim 7, further including CSP associations and measurements related to cloud SLA data model and structure analyzed along with CSP cloud SLA performance data and CSP cloud service performance data, and the CSP cloud service characteristics.

12. The system of claim 1, wherein the CSP trustworthiness level represents percentage of trust that the CSP will comply with cloud SLA expectations and will meet cloud service customer requirements.

13. The system of claim 1, wherein the CSP cloud service performance data includes downtime, latency, throughput, utilization, provisioning time.

14. A system for analyzing and ranking cloud service providers (CSPs), comprising:
   a processing device having:
   a processor-executed modeling module generating, by graph theory analysis, a cloud-standards and cloud service provider model based on cloud-standards data and cloud service provider data, wherein the cloud-standards data and cloud service provider data include cloud service level agreement (SLA) data and associations to security controls; and,
   a processor-executed trustworthiness module configured to determine, by multi-criteria decision analysis analytic hierarchy process (MCDA AHP), a CSP trustworthiness level for each CSP based on a comparison of the cloud-standards and cloud service provider model, CSP cloud SLA performance data, CSP cloud service performance data, and CSP cloud service characteristics.

15. The system of claim 14, further comprising a processor-executed predictive module that generates, using machine learning, a predictive model based on the trustworthiness level, the CSP cloud SLA performance data, the CSP cloud service performance data, and the CSP cloud service characteristics, to provide a CSP cloud service performance prediction and a CSP cloud SLA compliance prediction.

16. The system of claim 15, wherein the cloud SLA performance data includes performance of CSP cloud services to meet CSP cloud SLA availability targets; the CSP cloud service performance data includes downtime, latency, throughput, utilization, provisioning time; and the CSP cloud service characteristics include number of CSP service regions and location of global data centers.

17. The system of claim 14, wherein the CSP cloud service characteristics include number of CSP service regions and location of CSP global data centers.

18. The system of claim 14, wherein the CSP trustworthiness level represents percentage of trust that the CSP will comply with cloud SLA expectations and will meet cloud service customer requirements.

19. The system of claim 14, wherein CSP cloud service performance data includes downtime, latency, throughput, utilization, provisioning time.

* * * * *